(12) United States Patent
Czanta et al.

(10) Patent No.: US 7,445,819 B2
(45) Date of Patent: Nov. 4, 2008

(54) LIQUID CRYSTALLINE MEDIUM AND LIQUID CRYSTAL DISPLAY

(75) Inventors: Markus Czanta, Darmstadt (DE); Melanie Klasen-Memmer, Heuchelheim (DE); Eike Poetsch, Muehltal (DE); Lars Lietzau, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 26 days.

(21) Appl. No.: 11/698,280

(22) Filed: Jan. 26, 2007

(65) Prior Publication Data

US 2007/0205396 A1    Sep. 6, 2007

(30) Foreign Application Priority Data

Jan. 27, 2006  (EP)  .................... 06001671

(51) Int. Cl.
*C09K 19/34* (2006.01)
*C09K 19/30* (2006.01)
*C09K 19/12* (2006.01)
*C09K 19/20* (2006.01)

(52) U.S. Cl. .............. 428/1.1; 252/299.61; 252/299.63; 252/299.66; 252/299.67

(58) Field of Classification Search ................. 428/1.1; 252/299.61, 299.63, 299.66, 299.67
See application file for complete search history.

(56) References Cited

U.S. PATENT DOCUMENTS

| | | | |
|---|---|---|---|
| 5,841,499 | A | 11/1998 | Baur et al. |
| 5,958,290 | A | 9/1999 | Coates et al. |
| 6,027,665 | A | 2/2000 | Pausch et al. |
| 6,342,279 | B1 | 1/2002 | Tarumi et al. |
| 2004/0242905 | A1* | 12/2004 | Poetsch et al. ............... 549/330 |
| 2006/0278850 | A1* | 12/2006 | Czanta et al. ........... 252/299.61 |

FOREIGN PATENT DOCUMENTS

| | | |
|---|---|---|
| DE | 40 00 451 A1 | 7/1991 |
| DE | 195 28 106 A1 | 8/1996 |
| DE | 195 09 410 A1 | 9/1996 |
| DE | 195 28 107 A1 | 9/1996 |
| EP | 0588 568 A2 | 3/1994 |
| EP | 0 673 986 A2 | 3/1995 |
| EP | 0 667 555 B1 | 8/1995 |
| JP | 07-181439 | 7/1995 |
| WO | WO 91/05029 A1 | 4/1991 |
| WO | WO 96/23851 A1 | 8/1996 |
| WO | WO 96/28521 A1 | 9/1996 |
| WO | WO 2005/081215 * | 9/2005 |

OTHER PUBLICATIONS

Japanese Patent Abstract No. 07-181439 dated Jul. 21, 1995.

* cited by examiner

*Primary Examiner*—Shean C Wu
(74) *Attorney, Agent, or Firm*—Millen, White, Zelano, Branigan, P.C.

(57) ABSTRACT

A dielectrically positive liquid crystalline media comprising a dielectrically positive component, component A, comprising a dielectrically positive compound of formula I

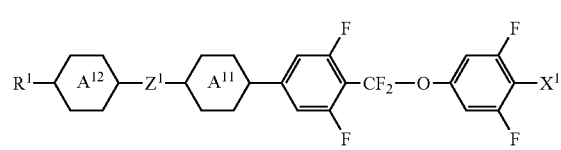

wherein the parameters have the meaning given in the specification, and optionally a second dielectrically positive component, component B, comprising one or more dielectrically positive compounds having a dielectric anisotropy of more than 3 and optionally a dielectric neutral component, component C, is suitable for use in liquid crystal displays, especially active matrix displays, and, in particular, TN and to IPS displays.

39 Claims, No Drawings

LIQUID CRYSTALLINE MEDIUM AND LIQUID CRYSTAL DISPLAY

FIELD OF THE INVENTION

The present invention relates to liquid crystalline media and to liquid crystal displays comprising these media, especially to displays addressed by an active matrix and in particular to displays of the Twisted Nematic (TN) or of the In Plane Switching (IPS) type.

STATE OF THE ART AND PROBLEM TO BE SOLVED

Liquid Crystal Displays (LCDs) are widely used to display information. LCDs are used for direct view displays, as well as for projection type displays. Electro-optical modes employed are, e.g., the twisted nematic (TN)-, the super twisted nematic (STN)-, the optically compensated bend (OCB)- and the electrically controlled birefringence (ECB)- mode with their various modifications, as well as others. All these modes use an electrical field, which is substantially perpendicular to the substrates, respectively to the liquid crystal layer. Besides these modes there are also electro-optical modes employing an electrical field substantially parallel to the substrates, respectively the liquid crystal layer, like, e.g., the In-Plane Switching mode (as disclosed, e.g., in DE 40 00 451 and EP 0 588 568). Especially this electro-optical mode is used for LCDs for modern desktop monitors and is envisaged to be applied for displays for multi media applications. The liquid crystals according to the present invention are preferably used in this type of displays.

For these displays new liquid crystalline media with improved properties are required. Especially the response times have to be improved for many types of applications. Thus, liquid crystalline media with lower viscosities ($\eta$), especially with lower rotational viscosities ($\gamma_1$) are required. The rotational viscosity should be 75 mPa·s or less, preferably 60 mPa·s or less and especially 55 mPa·s or less. Besides this parameter, the media have to exhibit a suitably wide range of the nematic phase, and an appropriate birefringence ($\Delta n$). Also, the dielectric anisotropy ($\Delta \in$) should be high enough to allow a reasonably low operation voltage. Preferably, $\Delta \in$ should be higher than 4 and very preferably higher than 5. However, $\Delta \in$ is preferably not higher than 15, and, in particular, not higher than 12, as this would be detrimental for an at least reasonably high specific resistivity.

The displays according to the present invention are preferably addressed by an active matrix (active matrix LCDs, short AMDs), preferably by a matrix of thin film transistors (TFTs). However, the inventive liquid crystals can also beneficially be used in displays with other known addressing means.

There are various different display modes using composite systems of liquid crystal materials of low molecular weight together with polymeric materials. These are, e.g., polymer dispersed liquid crystal (PDLC)-, nematic curvilinearly aligned phase (NCAP)- and polymer network (PN)-systems, as disclosed, for example, in WO 91/05 029 or axially symmetric microdomain (ASM) systems and others. In contrast to these, the modes especially preferred according to the instant invention use the liquid crystal medium as such, oriented on surfaces. These surfaces typically are pre-treated to achieve uniform alignment of the liquid crystal material. The display modes according to the instant invention preferably use an electrical field substantially parallel to the composite layer.

Liquid crystal compositions suitable for LCDs and especially for IPS displays are known, e.g., from JP 07-181 439 (A), EP 0 667 555, EP 0 673 986, DE 195 09 410, DE 195 28 106, DE 195 28 107, WO 96/23 851 and WO 96/28 521. These compositions, however, do have significant drawbacks. Most of them exhibit, amongst other deficiencies, unfavorably long response times, and/or too low values of the resistivity, and/or require operation voltages that are too high.

Thus, there is a significant need for liquid crystalline media with suitable properties for practical applications such as a wide nematic phase range, appropriate optical anisotropy $\Delta n$, according to the display mode used, a high $\Delta \in$, and especially low viscosities.

SUMMARY OF THE INVENTION

Surprisingly, it now has been found that liquid crystalline media with a suitably high $\Delta \in$, a suitable phase range, and suitable $\Delta n$ can be realized, which do not exhibit the drawbacks of the materials of the prior art or at least exhibit them to a significantly lesser degree.

Thus, in accordance with the invention, there are provided improved liquid crystalline media comprising at least the following components:

a first dielectrically positive component, component A, comprising one or more dielectrically positive compounds of formula I

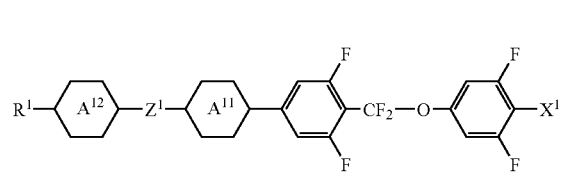

wherein
$R^1$ is alkyl, alkoxy, fluorinated alkyl or fluorinated alkoxy, in each case having 1 to 7 C-atoms, alkenyl, alkenyloxy, alkoxyalkyl or fluorinated alkenyl, in each case having 2 to 7 C-atoms, and preferably are alkyl or alkenyl,

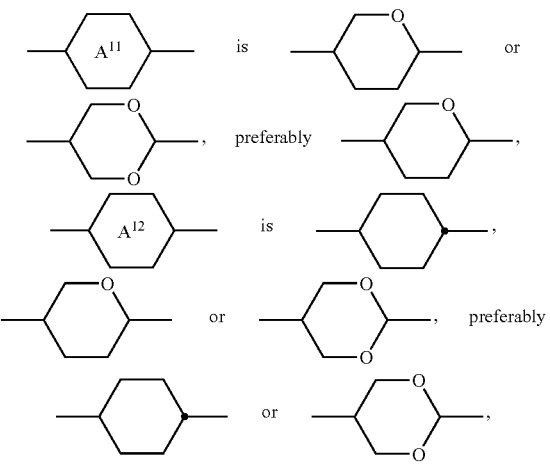

$X^1$ is halogen, halogenated alkyl or alkoxy each having 1 to 3 C-atoms, or halogenated alkenyl or alkenyloxy each having 2 or 3 C-atoms, preferably F, Cl, —OCF$_3$ or —CF$_3$, most preferably F, Cl or —OCF$_3$, and $Z^1$ is —$CH_2CH_2$—, —$CF_2CF_2$—, —COO—, trans- —CH=CH—, trans- —CF=CF—, —$CH_2O$— or a single bond, preferably —$CH_2CH_2$—, —COO—, trans- —CH=CH— or a single bond and most preferably —COO—, trans- —CH=CH—, trans- or a single bond; and optionally, a second dielectrically positive component, component B, comprising one or more dielectrically positive compounds having a dielectric anisotropy of more than 3, from which compounds of formula I are excluded, preferably selected from the group of compounds of formulae II and III

II

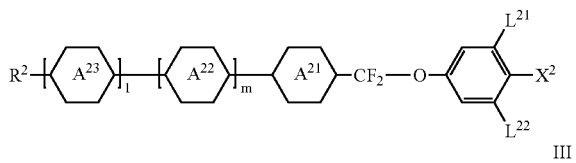

III

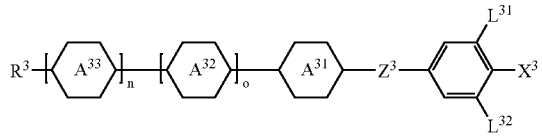

wherein $R^2$ and $R^3$, are each, independently of each other, are alkyl, alkoxy, fluorinated alkyl or fluorinated alkoxy, in each case having 1 to 7 C-atoms, alkenyl, alkenyloxy, alkoxyalkyl or fluorinated alkenyl, in each case having 2 to 7 C-atoms, and $R^2$ and $R^3$ preferably are alkyl or alkenyl,

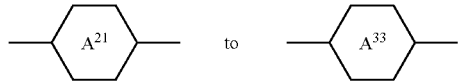

are each, independently of each other,

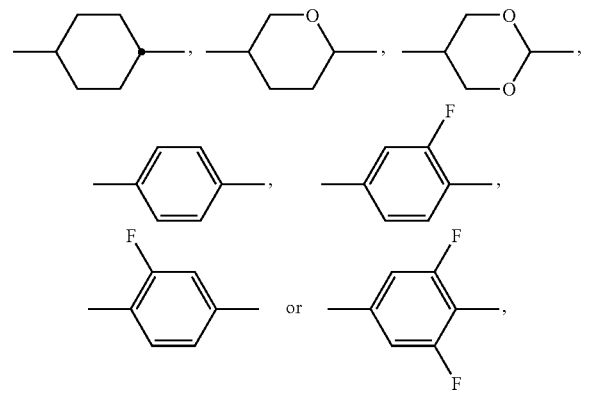

$L^{21}$, $L^{22}$, $L^{31}$ and $L^{32}$, are each, independently of each other, H or F, preferably $L^{21}$ and/or $L^{31}$ is F, $X^2$ and $X^3$ are each, independently of each other, halogen, halogenated alkyl or alkoxy each having 1 to 3 C-atoms, or halogenated alkenyl or alkenyloxy each having 2 or 3 C-atoms, preferably F, Cl, —$OCF_3$ or —$CF_3$, most preferably F, Cl or —$OCF_3$, $Z^3$ is —$CH_2CH_2$—, —$CF_2CF_2$—, —COO—, trans- —CH=CH—, trans- —CF=CF—, —$CH_2O$— or a single bond, preferably —$CH_2CH_2$—, —COO—, trans- —CH=CH— or a single bond and most preferably —COO—, trans- —CH=CH—, trans- or a single bond, and l, m, n and o are, independently of each other, 0 or 1; and optionally a dielectrically neutral component, component C, comprising one or more dielectrically neutral compounds of formula IV

IV

wherein $R^{41}$ and $R^{42}$, are each, independently of each other, a meaning given for $R^2$ under formula II above, preferably $R^{41}$ is alkyl and $R^{42}$ is alkyl or alkoxy or $R^{41}$ is alkenyl and $R^{42}$ is alkyl,

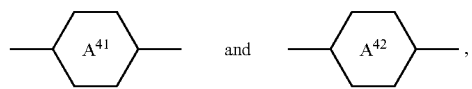

independently of each other, and in case

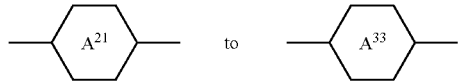

is present twice, also these, independently of each other, are

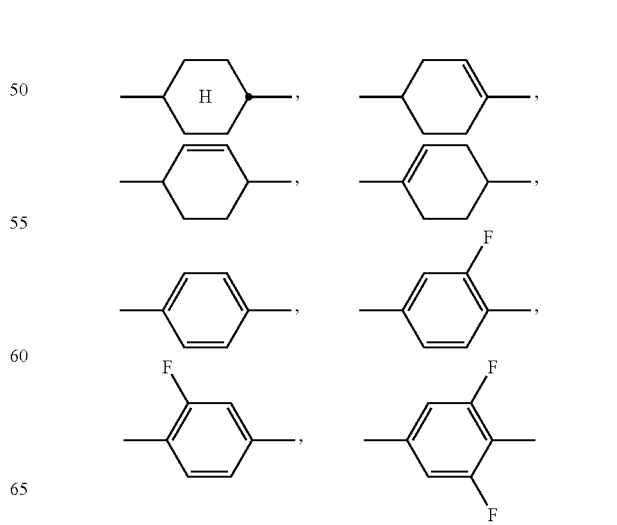

-continued

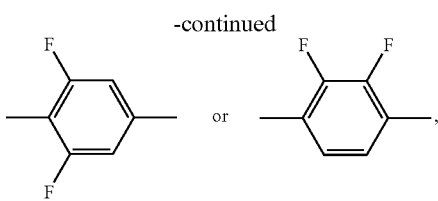

preferably at least one of

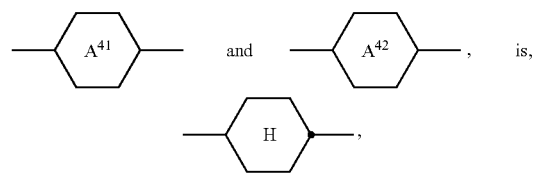

$Z^{41}$ and $Z^{42}$ are, independently of each other, and in case $Z^{41}$ is present twice, also these independently of each other, —CH$_2$CH$_2$—, —COO—, trans- —CH=CH—, trans- —CF=CF—, —CH$_2$O—, —CF$_2$O— or a single bond, preferably at least one of them is a single bond, and p is 0, 1 or 2, preferably 0 or 1.

Preferably, component A, comprises, more preferably it consists predominantly of, even more preferably consists essentially of, and most preferably consists entirely of one or more dielectrically positive compounds of formula I, having a dielectric anisotropy of more than 3, which preferably are selected from the group of formulae I-1 to I-3, in particular from I-1 and I-3

I-1
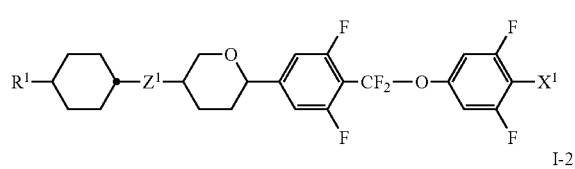

I-2
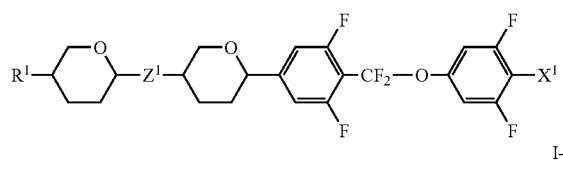

I-3
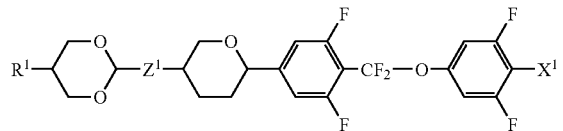

wherein the parameters have the respective meanings given under formula I above, and preferably $Z^1$ is a single bond, and preferably $X^1$ is F.

Preferably, the concentration of the component A in the medium is in the range from 1% to 70%, more preferably from 2% to 40%, even more preferably from 4% to 20% and most preferably from 5% to 15%.

Preferably, the media according to the present invention comprise a second dielectrically positive component, component B. Preferably, this second dielectrically positive component, component B, comprises, more preferably consists predominantly of, even more preferably consists essentially of, and most preferably consists entirely of dielectrically positive compounds having a dielectric anisotropy of more than 3.

Preferably, this component, component B, comprises, more preferably consists predominantly of, even more preferably it consists essentially of, and most preferably consists entirely of one or more dielectrically positive compounds having a dielectric anisotropy of more than 3, selected from the group of formulae II and III.

In a preferred embodiment of the present invention component B, comprises, more preferably consists predominantly of, even more preferably consists essentially of, and most preferably consists entirely of one or more dielectrically positive compounds having a dielectric anisotropy of more than 3, selected from the group of compounds of formulae II-1 and II-2

II-1
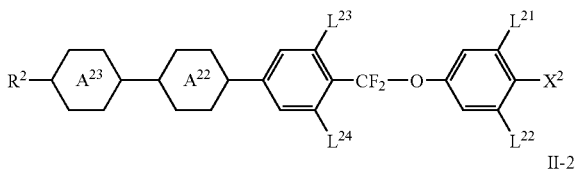

II-2
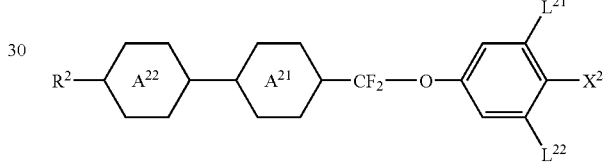

wherein the parameters have the respective meanings given under formula II above and in Formula II-1 and the parameters $L^{23}$ and $L^{24}$ are, independently of each other and of the other parameters, H or F.

Preferably, component B comprises compounds selected from the group of compounds of formulae II-1 and II-2, wherein $L^{21}$ and $L^{22}$ or $L^{23}$ and $L^{24}$ are both F In a preferred embodiment component B comprises compounds selected from the group of compounds of formulae II-1 and II-2, wherein $L^{21}$, $L^{22}$, $L^{23}$ and $L^{24}$ all are F.

Preferably, component B comprises one or more compounds of formula II-1. Preferably, the compounds of formula II-1 are selected from the group of compounds of formulae II-1a to II-1e II-1a
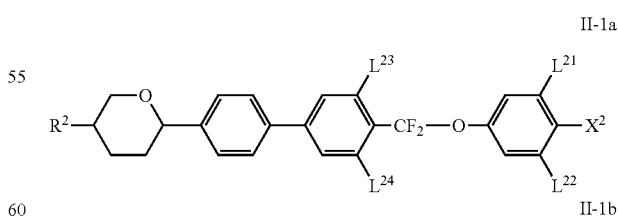

II-1b
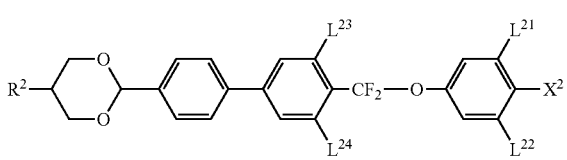

-continued

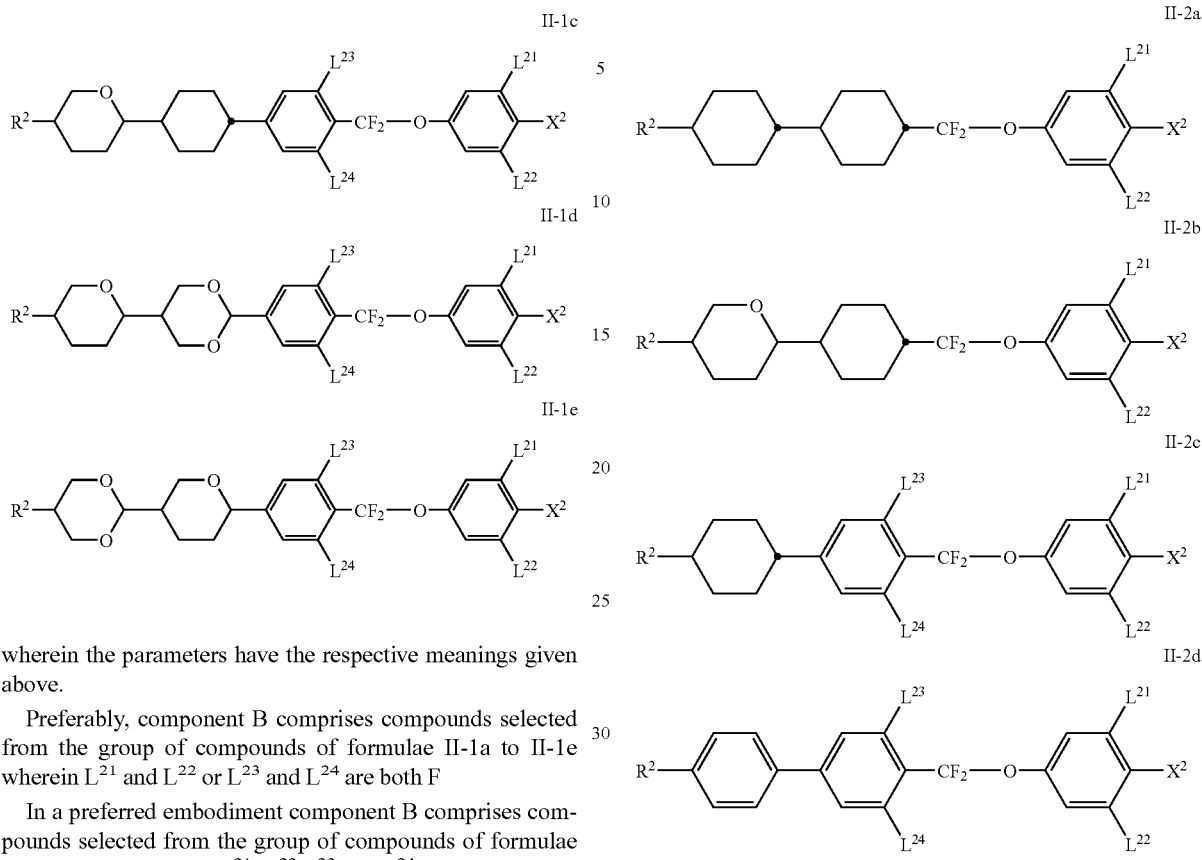

wherein the parameters have the respective meanings given above.

Preferably, component B comprises compounds selected from the group of compounds of formulae II-1a to II-1e wherein $L^{21}$ and $L^{22}$ or $L^{23}$ and $L^{24}$ are both F In a preferred embodiment component B comprises compounds selected from the group of compounds of formulae II-1a to II-1e, wherein $L^{21}$, $L^{22}$ $L^{23}$ and $L^{24}$ all are F.

Especially preferred compounds of formula II-1 are wherein the $R^2$ has the meaning given above.

Preferably, Component B comprises one or more compounds of formula II-2. Preferably, the compound of formula II-2 are selected from the group of compounds of formulae II-2a to II-2d

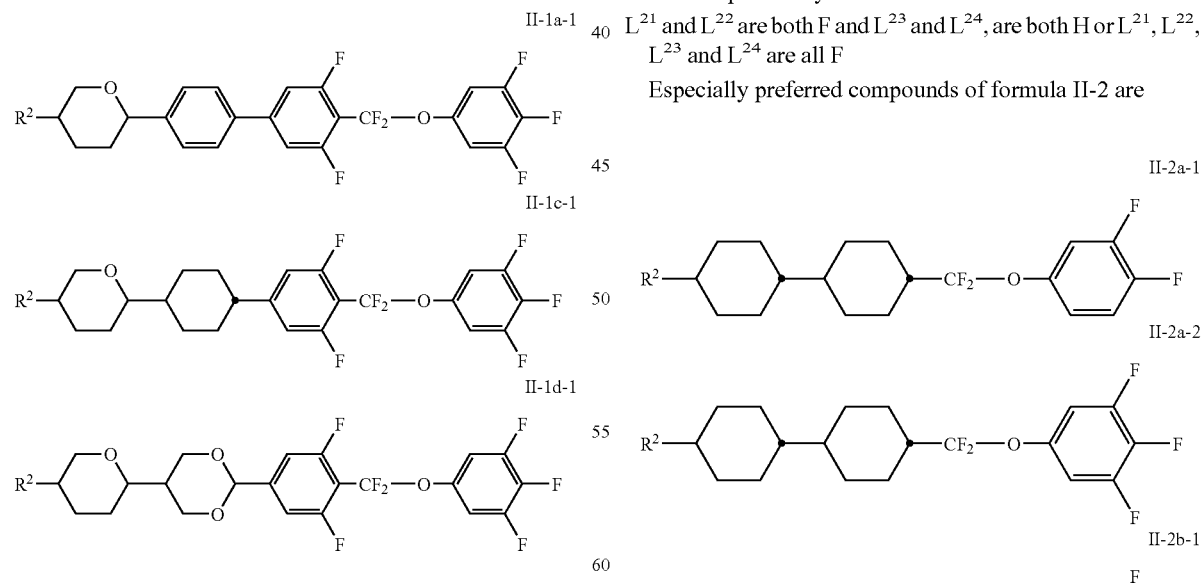

wherein the parameters have the respective meanings given above and preferably $L^{21}$ and $L^{22}$ are both F and $L^{23}$ and $L^{24}$, are both H or $L^{21}$, $L^{22}$, $L^{23}$ and $L^{24}$ are all F Especially preferred compounds of formula II-2 are -continued II-2d-1

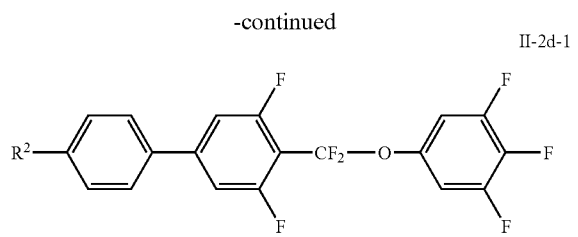

wherein the $R^2$ has the meaning given above.

In a further preferred embodiment of the present invention component B, comprises, more preferably consists predominantly of, even more preferably consists essentially of, and most preferably consists entirely of one or more dielectrically positive compounds having a dielectric anisotropy of more than 3, selected from the group of formulae III-1 and III-2

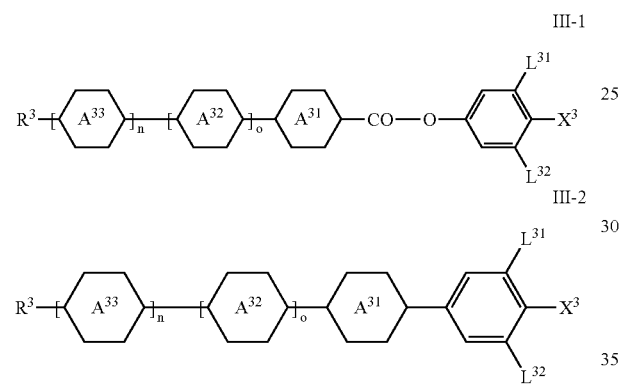

wherein the parameters have the respective meanings given under formula III above.

Preferably, component B comprises one or more compounds of formula III-1. Preferably, the compounds of formula III-1 are selected from the group of compounds of formulae III-1a and III-1b

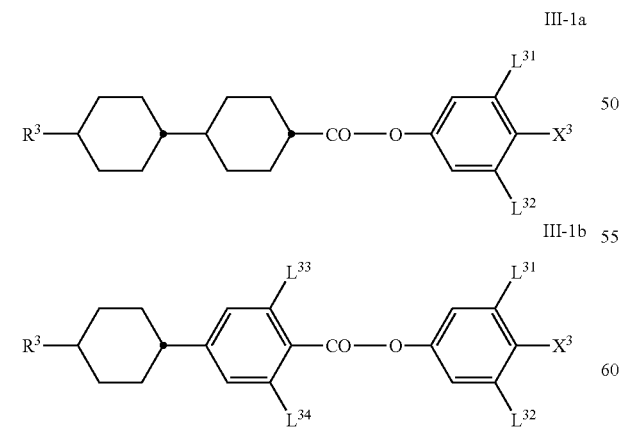

wherein the parameters have the respective meanings given above and the parameters $L^{33}$ and $L^{34}$ are, independently of each other and of the other parameters, H or F.

Preferably, component B comprises one or more compounds of formula III-2. Preferably, the compounds of formula III-2 are selected from the group of compounds of formulae III-2a to III-2g

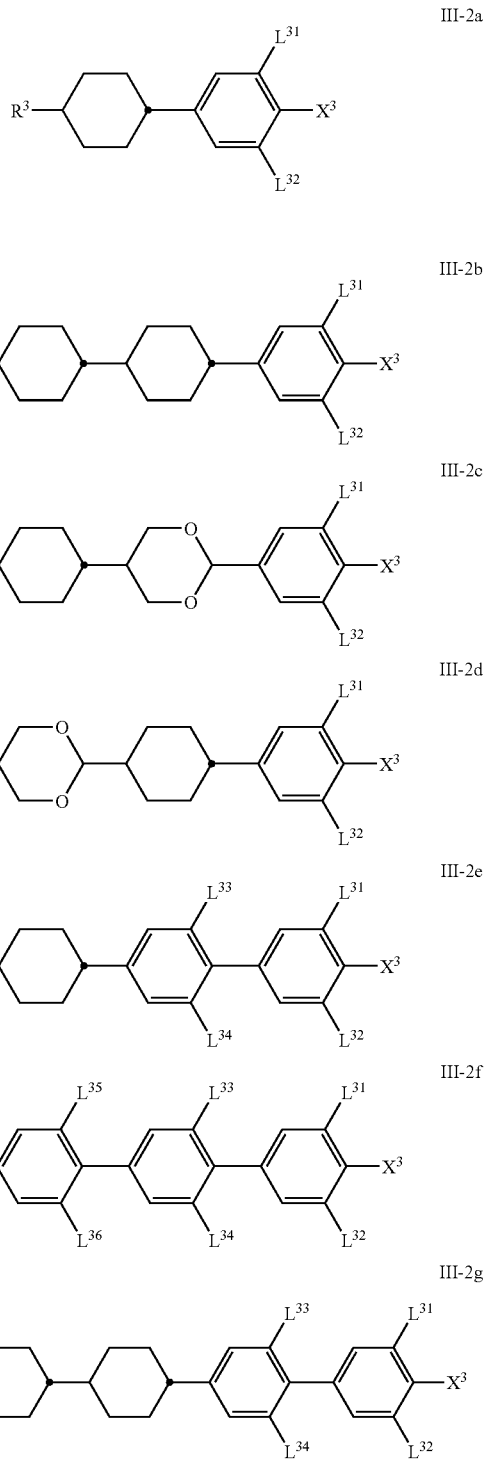

wherein the parameters have the respective meanings given above and the parameters $L^{35}$ and $L^{36}$ are, independently of each other and of the other parameters, H or F.

Preferably, component B comprises one or more compounds of formula III-1a, which preferably are selected from the group of compounds of formulae III-1a-1 to III-1a-6

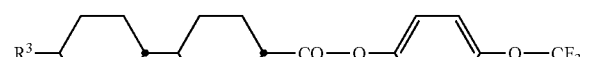
III-1a-1

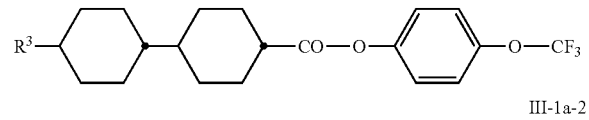
III-1a-2

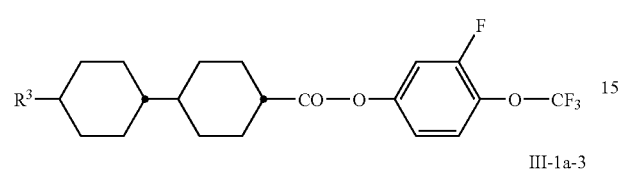
III-1a-3

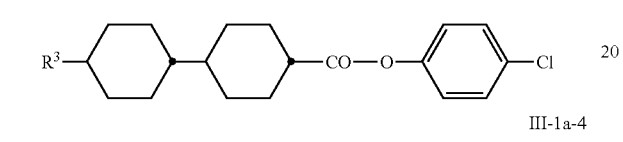
III-1a-4

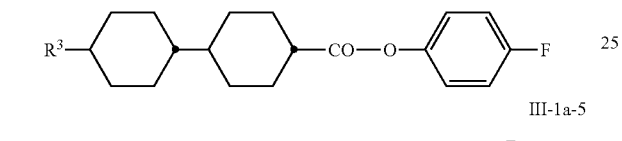
III-1a-5

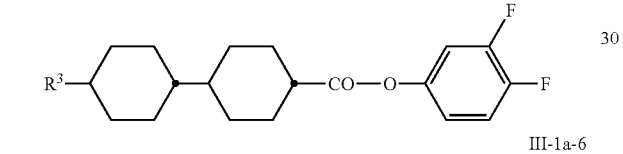
III-1a-6

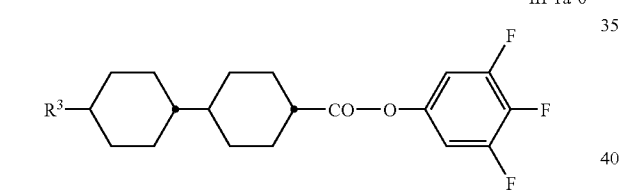

wherein the $R^3$ has the meaning given above.

Preferably, component B comprises one or more compounds of formula III-2a, which are preferably selected from the group of compounds of formulae III-2a-1 to III-2a-4

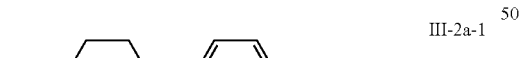
III-2a-1

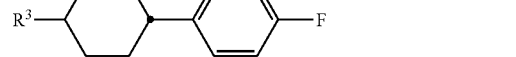
III-2a-2

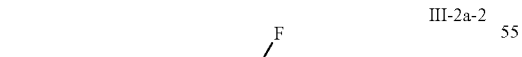
III-2a-3

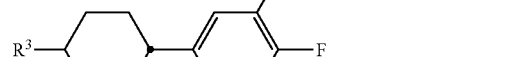
III-2a-4

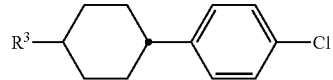

wherein the $R^3$ has the meaning given above.

Preferably, component B comprises one or more compounds of formula III-2b, which are preferably selected from the group of compounds of formulae III-2b-1 to III-2b-5

III-2b-1

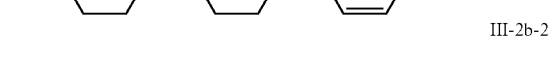
III-2b-2

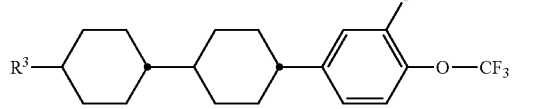
III-2b-3

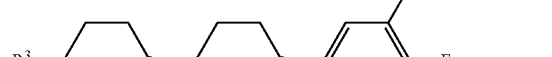
III-2b-4

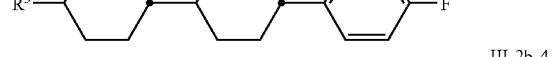
III-2b-5 wherein the $R^3$ has the meaning given above.

Preferably, component B comprises one or more compounds selected from the group of compounds of formulae III-2c and III-2d, which are preferably selected from the group of compounds of formulae III-2c-1 and III-2d-1

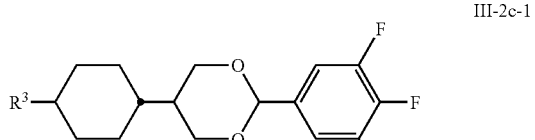
III-2c-1

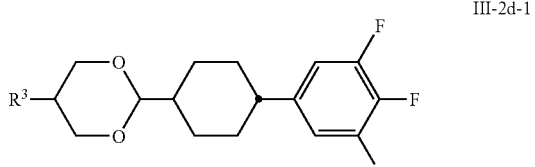
III-2d-1 wherein the $R^3$ has the meaning given above.

Preferably, component B comprises one or more compounds of formula III-2e, which are preferably selected from the group of compounds of formulae III-2e-1 to III-2e-5

III-2e-1
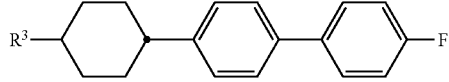

III-2e-2
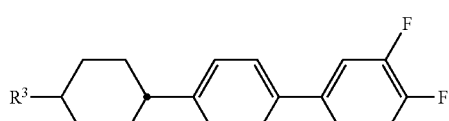

III-2e-3
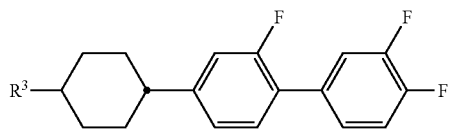

III-2e-4
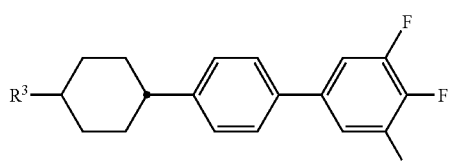

III-2e-5
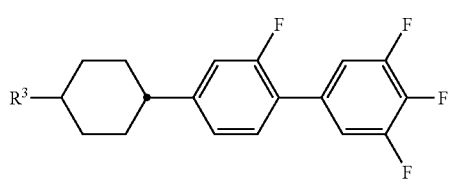

wherein the R³ has the meaning given above.

Preferably, component B comprises one or more compounds of formula III-2f, which are preferably selected from the group of compounds of formulae III-2f-1 to III-2f-5

III-2f-1
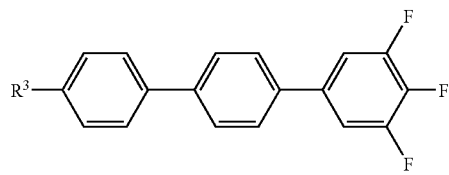

-continued

III-2f-2
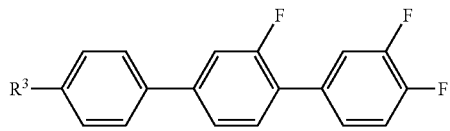

III-2f-3
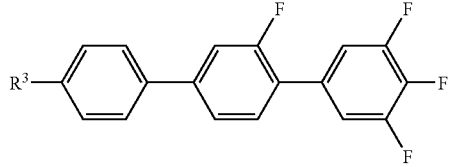

III-2f-4
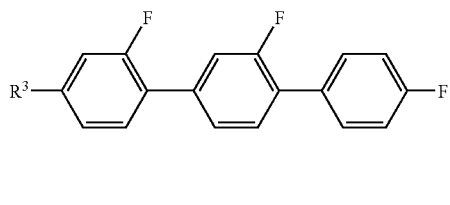

III-2f-5
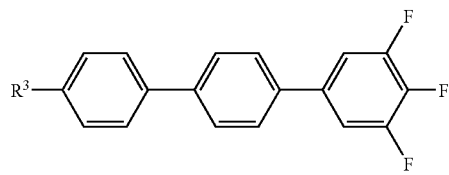

wherein the R³ has the meaning given above.

Preferably, component B comprises one or more compounds of formula III-2g, which are preferably selected from the group of compounds of formulae III-2g-1 to III-2g-3

III-2g-1
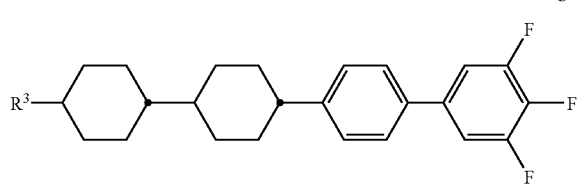

III-2g-2
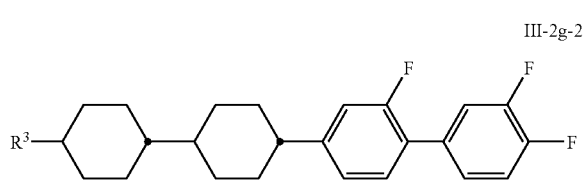

-continued

III-2g-3

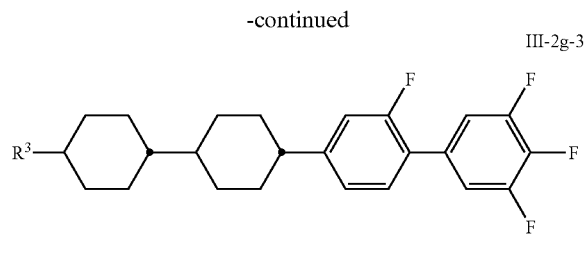

wherein the $R^3$ has the meaning given above.

Alternatively or additionally to compounds of formulae III-1 and/or III-2 the media according to the present invention may comprise one or more compounds of formula III-3

III-3

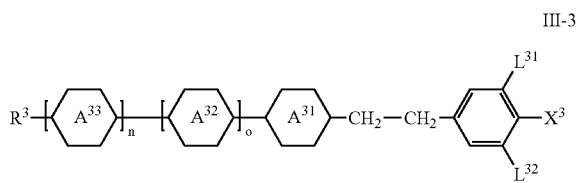

wherein the parameters have the respective meanings given under formula III above, and preferably of formula III-3a III-3a

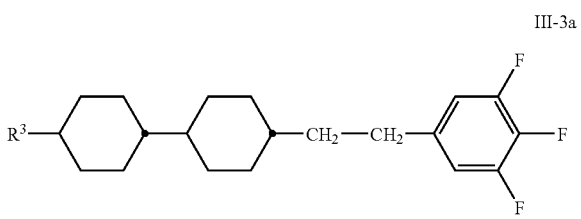

wherein the $R^3$ has the meaning given above.

Preferably, the liquid crystalline media according to the present invention comprise a dielectrically neutral component, component C. This component has a dielectric anisotropy in the range from −1.5 to 3. Preferably, it comprises, preferably consists predominantly of, preferably consists essentially of, and especially preferably consists entirely of dielectrically neutral compounds, having a dielectric anisotropy in the range from −1.5 to 3. Preferably, this component comprises one or more, more preferably consists predominantly of, more preferably consists essentially of, and especially preferably consists entirely of dielectrically neutral compounds, having a dielectric anisotropy in the range from −1.5 to 3, of formula IV.

Preferably, the dielectrically neutral component, component C, comprises one or more compounds selected from the group of compounds of formulae IV-1 to IV-5

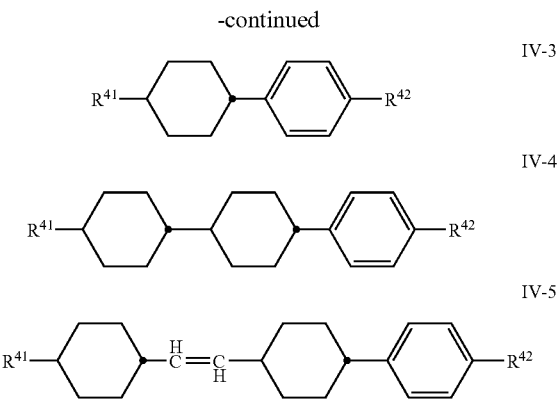

wherein $R^{41}$ and $R^{42}$ have the respective meanings given under formula IV above, and in formulae IV-1, IV-4 and IV-5 $R^{41}$ preferably is alkyl or alkenyl, preferably alkenyl and $R^{42}$ preferably is alkyl or alkenyl, preferably alkyl, in formula IV-2 $R^{41}$ and $R^{42}$ preferably are each alkyl and in formula IV-3 $R^{41}$ preferably is alkyl or alkenyl, preferably alkyl and $R^{42}$ preferably is alkyl or alkoxy, preferably alkoxy.

Preferably, the dielectrically neutral component, component C, comprises one or more compounds selected from the group of compounds of formulae IV-1, IV-3, IV-4 and IV-5, preferably one or more compounds of formula IV-1 and one or more compounds selected from the group of formulae IV-3 and IV-4, preferably one or more compounds each of formulae IV-1, IV-3 and IV-4 and most preferably one or more compounds each of formulae IV-1, IV-3, IV-4 and IV-5.

In a further preferred embodiment of the present invention, which may be part of the previously described embodiments or a different one, the liquid crystal mixtures according to the present invention comprise component C, comprising, preferably predominantly consisting of and most preferably entirely consisting of compounds of formula IV selected from the group of compounds of formulae IV-1 to IV-5, as shown above, and optionally of formulae IV-6 to IV-13

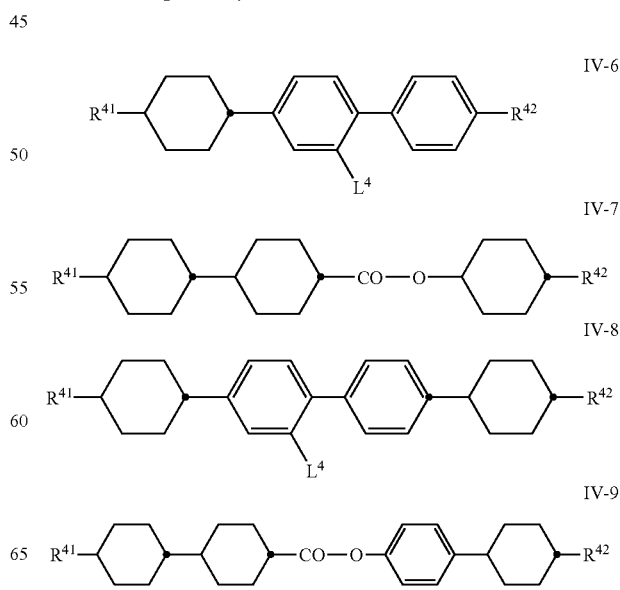

-continued

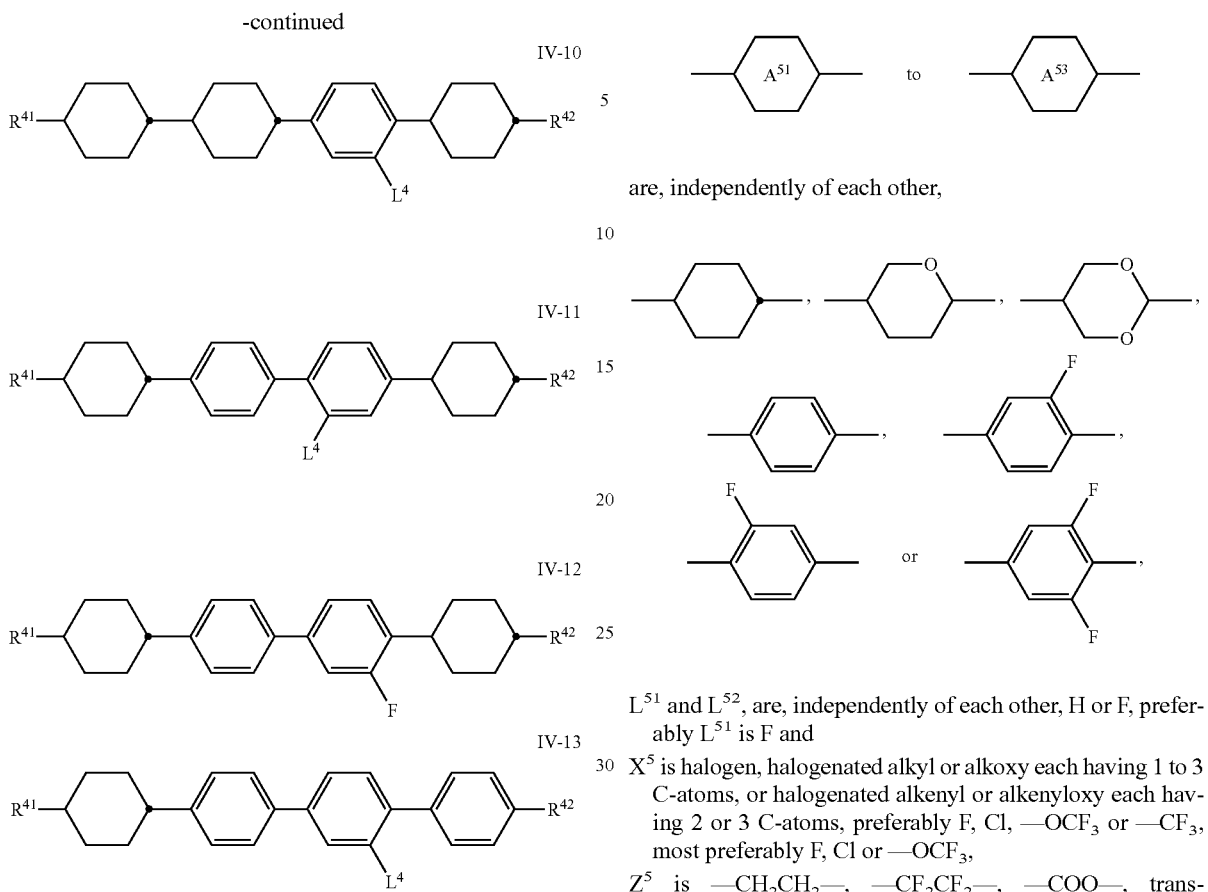

wherein
$R^{41}$ and $R^{42}$ are each, independently of each other, alkyl, alkoxy, fluorinated alkyl or fluorinated alkoxy, in each case having 1 to 7 C-atoms, or alkenyl, alkenyloxy, alkoxyalkyl or fluorinated alkenyl, in each case having 2 to 7 C-atoms and
$L^4$ is H or F.

Alternatively or additionally to compounds of formulae II and/or III the media according to the present invention my comprise one or more dielectrically positive compounds of formula V

V wherein
$R^5$ is alkyl, alkoxy, fluorinated alkyl or fluorinated alkoxy, in each case having 1 to 7 C-atoms, or alkenyl, alkenyloxy, alkoxyalkyl or fluorinated alkenyl, in each case having 2 to 7 C-atoms, and preferably is alkyl or alkenyl, $A^{51}$ to $A^{53}$ are, independently of each other, $L^{51}$ and $L^{52}$, are, independently of each other, H or F, preferably $L^{51}$ is F and
$X^5$ is halogen, halogenated alkyl or alkoxy each having 1 to 3 C-atoms, or halogenated alkenyl or alkenyloxy each having 2 or 3 C-atoms, preferably F, Cl, —OCF$_3$ or —CF$_3$, most preferably F, Cl or —OCF$_3$,
$Z^5$ is —CH$_2$CH$_2$—, —CF$_2$CF$_2$—, —COO—, trans- —CH=CH—, trans- —CF=CF— or —CH$_2$O—, preferably —CH$_2$CH$_2$—, —COO— or trans- —CH=CH— and most preferably —COO— or —CH$_2$CH$_2$—, and
q is 0 or 1.

Preferably, the media according to the present invention comprises one or more compounds of formula V, preferably selected from the group of compounds of formulae V-1 and V-2

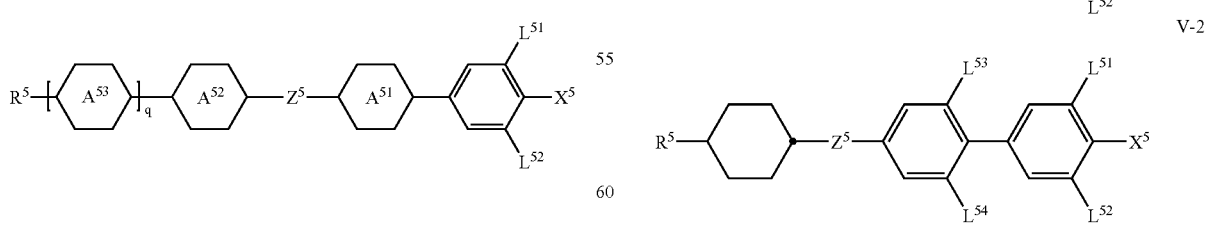

wherein the parameters have the respective meanings given above and the parameters $L^{53}$ and $L^{54}$ are, independently of each other and of the other parameters, H or F and preferably $Z^5$ is —CH$_2$—CH$_2$—.

Preferably, the compounds of formula V-1 are selected from the group of compounds of formulae V-1a and V-1b

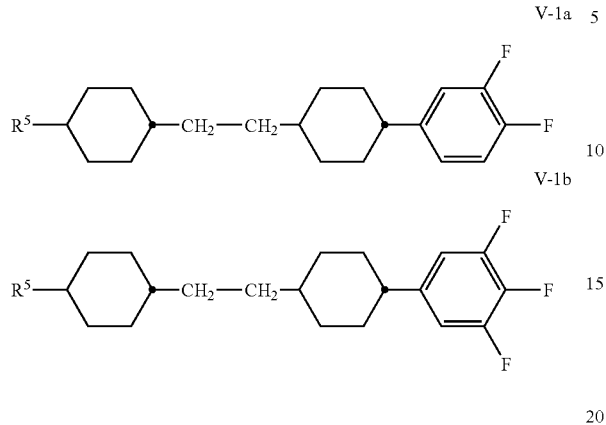

wherein the $R^5$ has the meaning given above.

Preferably, the compounds of formula V-2 are selected from the group of compounds of formulae V-2a to V-2d

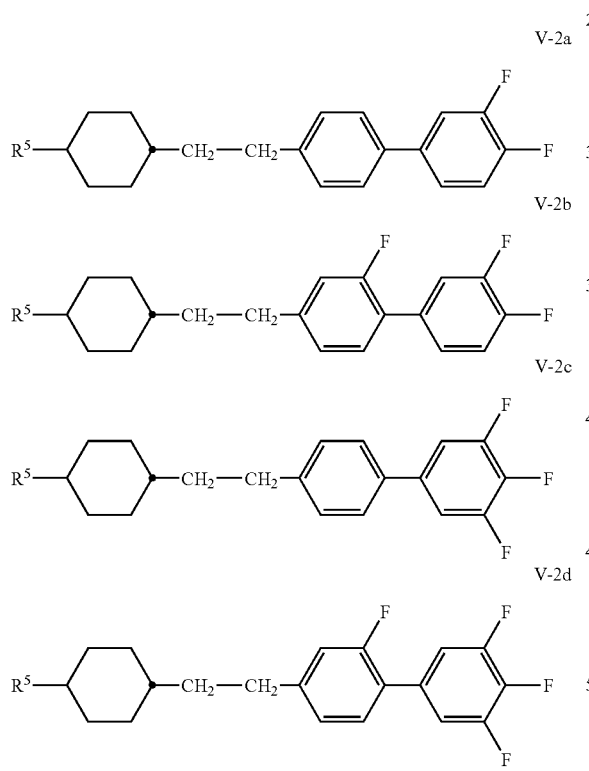

wherein the $R^5$ has the meaning given above.

Preferably, the liquid crystalline media according to the present invention comprise an additional dielectrically neutral component, component D. This component has a dielectric anisotropy in the range from −1.5 to 3. Preferably, it comprises, preferably consists predominantly of, preferably consists essentially of, and especially preferably consists entirely of dielectrically neutral compounds, having a dielectric anisotropy in the range from −1.5 to 3. Preferably, this component comprises one or more, more preferably consists predominantly of, more preferably consists essentially of, and especially preferably consists entirely of dielectrically neutral compounds, having a dielectric anisotropy in the range from −1.5 to 3, of formula VI

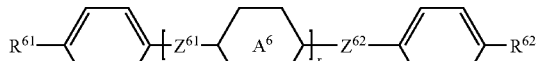

wherein
$R^{61}$ and $R^{62}$, independently of each other have a meaning given for $R^2$ under formula II above, preferably $R^{61}$ is alkyl and $R^{62}$ is alkyl or alkenyl,

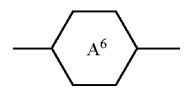

and in case it is occurring twice in each occurrence independently of each other, is

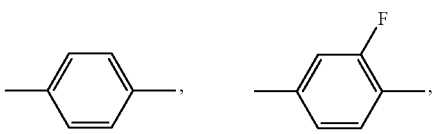

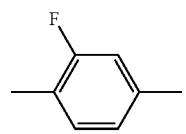

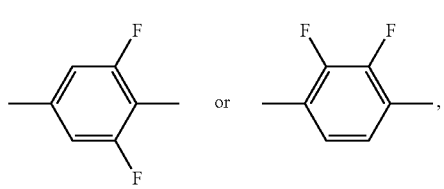

preferably at least one of

$Z^{61}$ and $Z^{62}$ are, independently of each other, and in case $Z^{61}$ is present twice, also these independently of each other, —CH$_2$CH$_2$—, —COO—, trans- —CH═CH—, trans- —CF═CF—, —CH$_2$O—, —CF$_2$O— or a single bond, preferably at least one of them is a single bond, and
r is 0, 1 or 2, preferably 0 or 1.

Preferably, the dielectrically neutral component, component D, comprises one or more compounds selected from the group of compounds of formulae VI-1 and VI-2

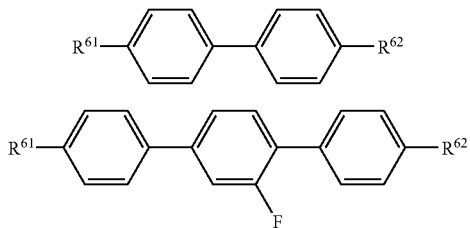

VI-1

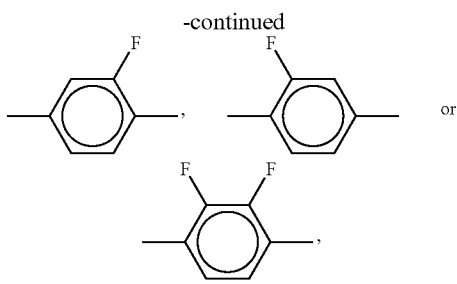

VI-2 wherein $R^{61}$ and $R^{62}$ have the respective meanings given under formula VI above and $R^{61}$ preferably is alkyl and in formula VI-1 $R^{62}$ preferably is alkenyl, preferably —(CH$_2$)$_2$—CH=CH—CH$_3$ and in formula VI-2 $R^{62}$ preferably is alkyl.

Preferably, the dielectrically neutral component, component D, comprises one or more compounds selected from the group of compounds of formulae VI-1 and VI-2 wherein preferably $R^{61}$ is n-alkyl and in formula VI-1 $R^{62}$ preferably is alkenyl and in formula VI-2 $R^{62}$ preferably is n-alkyl.

Preferably, the liquid crystal mixtures according to the present invention do contain at least one further component besides components A and B. This third component may be either one of components C and D, preferably the third component present is component C.

Obviously the mixtures according to the present invention also can contain all four components A, B, C and D.

Additionally, the liquid crystal mixtures according to the present invention may comprise a further optional component, component E, which has a negative dielectric anisotropy and comprises, preferably predominantly consists of, more preferably essentially consists of, and most preferably entirely consists of dielectrically negative compounds preferably of formula VII

VII

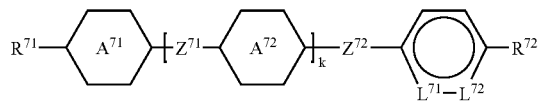

wherein
$R^{71}$ and $R^{72}$ independently of each other have a meaning given for $R^2$ under formula II above,

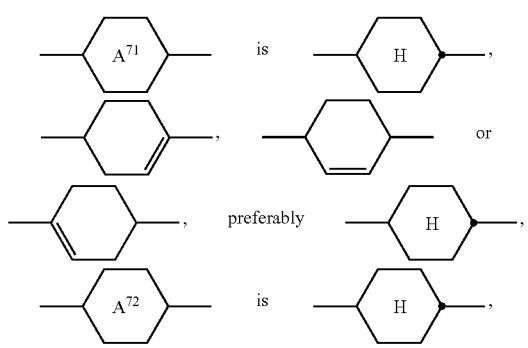

$Z^{71}$ and $Z^{72}$ are each, independently of each other, —CH$_2$CH$_2$—, —COO—, trans- CH=CH—, trans- —CF=CF—, —CH$_2$O—, —CF$_2$O— or a single bond, preferably at least one of them is a single bond and most preferably both are a single bond, $L^{71}$ and $L^{72}$ are each, independently of each other, C—F or N, preferably at least one of them is C—F and most preferably both of them are C—F, and k is 0 or 1.

Preferably, the liquid crystalline media according to the instant invention comprise, more preferably predominantly consist of, more preferably essentially consist of, and most preferably entirely consist of components A to E, preferably A to D and most preferably A to C, and in particular of compounds selected from the group of compounds of formulae I to VII, preferably I to V and most preferably I to III.

Comprising in this application means in the context of compositions that the entity referred to, e.g., the medium or the component, contains the component or components or of the compound or compounds in question, preferably in a total concentration of 10% or more and most preferably of 20% or more.

Predominantly consisting of, in this context, means that the entity referred to contains 55% or more, preferably 60% or more and most preferably 70% or more of the component or components or of the compound or compounds in question.

Essentially consisting of, in this context, means that the entity referred to contains 80% or more, preferably 90% or more and most preferably 95% or more of the component or components or of the compound or compounds in question.

Entirely consisting of, in this context, means that the entity referred to contains 98% or more, preferably 99% or more and most preferably 100.0% of the component or components or of the compound or compounds in question.

Component E preferably comprises, preferably predominantly consists of, and most preferably entirely consists of one or more compounds of formula VII, preferably selected from the group of compounds of formulae VII-1 to VII-3

VII-1

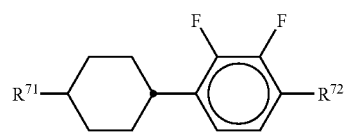

VII-2

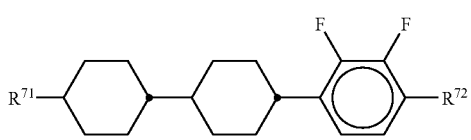

VII-3

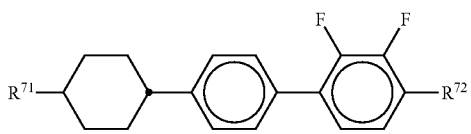

wherein
$R^{71}$ and $R^{72}$ have the respective meanings given under formula VI above.

In formulae VII-1 to VI-3, $R^{71}$ preferably is n-alkyl or 1-E-alkenyl and $R^{72}$ preferably is n-alkyl or alkoxy.

Also other mesogenic compounds, which are not explicitly mentioned above, can optionally and beneficially be used in the media according to the instant invention. Such compounds are known to the expert in the field.

The liquid crystal media according to the instant invention are characterized by a clearing point of 70° C. or more, preferably of 75° C. or more.

The Δn, at 589 nm ($Na^D$) and 20° C., of the liquid crystal media according to the instant invention preferably is in the range of 0.060 or more to 0.135 or less, more preferably in the range of 0.070 or more to 0.125 or less and most preferably in the range of 0.080 or more to 0.120 or less. Particularly preferred are media with Δn of 0.11 or less and preferrably of 0.10 or less.

The Δ∈, at 1 kHz and 20° C., of the liquid crystal media according to the invention preferably is 4.0 or more, more preferably 6.0 or more, and most preferably 8.0 or more. In particular Δϵ is 10.0 or more.

Preferably, the nematic phase of the inventive media extends at least from 0° C. or less to 70° C. more, more preferably at least from −20° C. or less to 70° C. more, most preferably at least from −30° C. or less to 75° C. more and in particular at least from −40° C. or less to 75° C. more.

In a first preferred embodiment of the present invention the Δn of the liquid crystal media is in the range of 0.090 or more to 0.125 or less, more preferably in the range of 0.095 or more to 0.120 or less and most preferably in the range of 0.100 or more to 0.115 or less, whereas Δ∈ preferably is in the range from 4.0 or more to 10.0 or less, preferably 7.0 or less.

In a second preferred embodiment of the present invention the Δn of the liquid crystal media is in the range of 0.085 or more to 0.130 or less, more preferably in the range of 0.090 or more to 0.125 or less and most preferably in the range of 0.095 or more to 0.120 or less, whereas Δ∈ preferably is 6.0 or more, more preferably 7.0 or more, even more preferably 8.0 or more and most preferably in the range from 8.0 or more to 10.0 or less.

In this embodiment preferably the nematic phase of the inventive media extends at least from −20° C. or less to 70° C. more, more preferably at least from −20° C. or less to 70° C. more, most preferably at least from −30° C. or less to 70° C. more, and in particular at least from −40° C. or less to 70° C. more.

In a third preferred embodiment of the present invention the Δn of the liquid crystal media is in the range of 0.070 or more to 0.120 or less, more preferably in the range of 0.075 or more to 0.115 or less, and most preferably in the range of 0.080 or more to 0.110 or less, whereas Δ∈preferably is 4.0 or more, more preferably is in the range from 4.0 or more to 14.0 or less, and most preferably either in the range from 4.0 or more to 6.0 or less or, particularly preferred in the range from 6.0 or more to 11.0 or less.

In this embodiment preferably the nematic phase of the inventive media extends at least from −20° C. or less to 75° C. more, more preferably at least from −30° C. or less to 70° C. more, most preferably at least from −30° C. or less to 75° C. more and in particular at least from −30° C. or less to 80° C. more.

Component A preferably is used in a concentration from 1% to 65%, more preferably from 2% to 60%, more preferably from 3% to 50%, and most preferably from 5% to 40% of the total mixture.

Component B preferably is used in a concentration from 5% to 60% more preferably from 10% to 55%, more preferably from 15% to 50% and most preferably from 20% to 45% of the total mixture.

Component C preferably is used in a concentration from 0% to 70%, more preferably from 10% to 60%, more preferably from 20% to 50% and most preferably from 15% to 50% of the total mixture.

Component D preferably is used in a concentration from 0% to 50%, preferably from 1% to 40%, more preferably from 5% to 30% and most preferably from 10% to 20% of the total mixture.

Component E preferably is used in a concentration from 0% to 30%, preferably from 0% to 15% and most preferably from 1% to 10% of the total mixture.

Optionally, the inventive media can comprise further liquid crystal compounds in order to adjust the physical properties. Such compounds are known to the expert. Their concentration in the media according to the instant invention is preferably 0% to 30%, more preferably 0.1% to 20% and most preferably 1% to 15%.

In the first preferred embodiment of the present invention mentioned above component A preferably is used in a concentration from 40% to 65%, more preferably from 45% to 60% and most preferably from 50% to 57% of the total mixture, whereas component D preferably is used in a concentration from 5% to 40%, preferably from 10% to 35% and most preferably from 10% to 30% of the total mixture.

In this preferred embodiment the media preferably comprise one or more compounds of formula VI and most preferably of formula VI-2.

Especially in the second preferred embodiment of the present invention mentioned above component C preferably comprises one or more compounds of formula IV, more preferably of formula IV-1, more preferably of formula CC-n-V and/or CC-n-Vm (see Tables below), more preferably of formula CC-n-V1 and/or CC-n-V and most preferably selected from the group of formulae CC-3-V, CC-4-V, CC-5-V and CC-3-V1.

Preferably, the liquid crystal media contain 50% to 100%, more preferably 70% to 100% and most preferably 80% to 100% and in particular 90% to 100% totally of components A, B, C and D, preferably of components A, B and C, which, in turn, contain, preferably predominantly consist of and most preferably entirely consist of one or more of compounds of formulae I, II, III, IV, V, VI and VII, preferably of formulae I, II, III, IV, V and VI, respectively.

In the present application the term dielectrically positive means compounds or components with Δ∈>3.0, dielectrically neutral with −1,5≦Δ∈≦3.0 and dielectrically negative with Δ∈<−1,5. Δ∈ is determined at a frequency of 1 kHz and at 20° C. The dielectric anisotropy of the respective compound is determined from the results of a solution of 10% of the respective individual compound in a nematic host mixture. In case the solubility of the respective compound in the host mixture is less than 10% the concentration is reduced to 5%. The capacities of the test mixtures are determined both in a cell with homeotropic and with homogeneous alignment. The cell gap of both types of cells is approximately 20 µm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest. The values are extrapolated to a concentration of the compounds of interest of 100%.

Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$), also called Freedericksz-threshold ($V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm. The dielectric anisotropy ($\Delta \epsilon$) is determined at a frequency of 1 kHz. The threshold voltages, as well as all other electro-optical properties have been determined with test cells prepared at Merck KGaA, Germany. The test cells for the determination of $\Delta \epsilon$ had a cell gap of approximately 20 µm. The electrode was a circular ITO electrode with an area of 1.13 cm$^2$ and a guard ring. The orientation layers were lecithin for homeotropic orientation ($\epsilon \|$) and polyimide AL-1054 from Japan Synthetic Rubber for homogeneuous orientation ($\epsilon_\perp$). The capacities were determined with a frequency response analyser Solatron 1260 using a sine wave with a voltage of 0.3 $V_{rms}$. The light used in the electro-optical measurements was white light. The set up used was commercially available equipment of Otsuka, Japan. The characteristic voltages have been determined under perpendicular observation. The threshold ($V_{10}$)-mid grey ($V_{50}$)-and saturation ($Vg_{90}$) voltages have been determined for 10%, 50% and 90% relative contrast, respectively.

The liquid crystal media according to the present invention can contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 4 to 20 and most preferably of 4 to 16 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be, e.g., homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-AMD, VAN-AMD, IPS and OCB LCDs and in particular in composite systems, like PDLC, NCAP, PN LCDs and especially in ASM-PA LCDs.

The melting point T(C,N), the transition from the smectic (S) to the nematic (N) phase T(S,N) and the clearing point T(N,I) of the liquid crystals are given in degrees centigrade.

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$ and $C_mH_{2m+1}$ are straight chain alkyl groups with n respectively m C-atoms. The interpretation of table B is self-evident. Table A does only list the abbreviations for the cores of the structures. The individual compounds are denoted by the abbreviation of the core followed by a hyphen and a code specifying the substituents $R^1$, $R^2$, $L^1$ and $L^2$ follows:

| Code for $R^1, R^2, L^1, L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | H | F |
| nN•F•F | $C_nH_{2n+1}$ | CN | F | F |
| nF | $C_nH_{2n+1}$ | F | H | H |
| nF•F | $C_nH_{2n+1}$ | F | H | F |
| nF•F•F | $C_nH_{2n+1}$ | F | F | F |
| nOF | $OC_nH_{2n+1}$ | F | H | H |
| nCl | $C_nH_{2n+1}$ | Cl | H | H |

-continued

| Code for R¹, R², L¹, L² | R¹ | R² | L¹ | L² |
|---|---|---|---|---|
| nCl•F | $C_nH_{2n+1}$ | Cl | H | F |
| nCl•F•F | $C_nH_{2n+1}$ | Cl | F | F |
| nCF₃ | $C_nH_{2n+1}$ | $CF_3$ | H | H |
| nCF₃•F | $C_nH_{2n+1}$ | $CF_3$ | H | F |
| nCF₃•F•F | $C_nH_{2n+1}$ | $CF_3$ | F | F |
| nOCF₃ | $C_nH_{2n+1}$ | $OCF_3$ | H | H |
| nOCF₃•F | $C_nH_{2n+1}$ | $OCF_3$ | H | F |
| nOCF₃•F•F | $C_nH_{2n+1}$ | $OCF_3$ | F | F |
| nOCF₂ | $C_nH_{2n+1}$ | $OCHF_2$ | H | H |
| nOCF₂•F | $C_nH_{2n+1}$ | $OCHF_2$ | H | F |
| nOCF₂•F•F | $C_nH_{2n+1}$ | $OCHF_2$ | F | F |
| nS | $C_nH_{2n+1}$ | NCS | H | H |
| nS•F | $C_nH_{2n+1}$ | NCS | H | F |
| nS•F•F | $C_nH_{2n+1}$ | NCS | F | F |
| rVsN | $C_rH_{2r+1}-CH=CH-C_sH_{2s}-$ | CN | H | H |
| rEsN | $C_rH_{2r+1}-O-C_sH_{2s}-$ | CN | H | H |
| nAm | $C_nH_{2n+1}$ | $COOC_mH_{2m+1}$ | H | H |

TABLE A

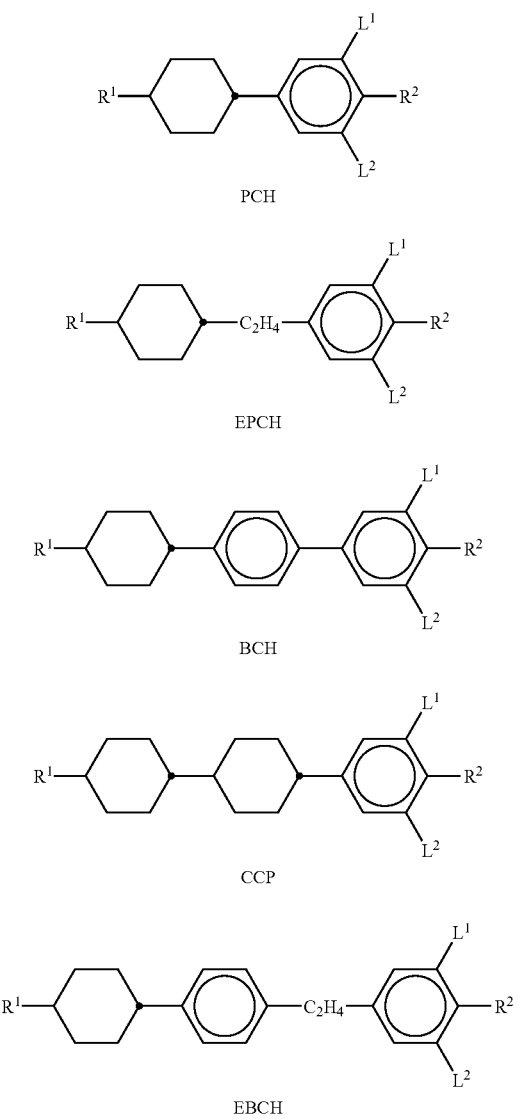

PCH

EPCH

BCH

CCP

EBCH

TABLE A-continued

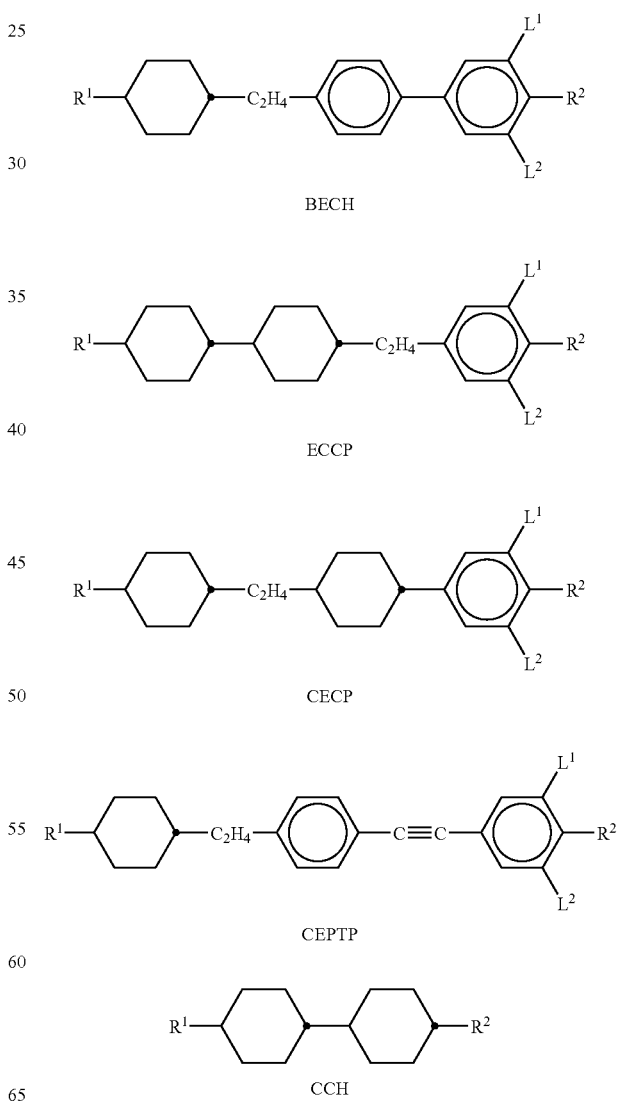

BECH

ECCP

CECP

CEPTP

CCH

TABLE A-continued
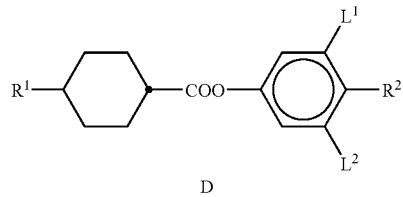
D
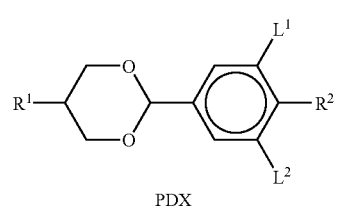
PDX
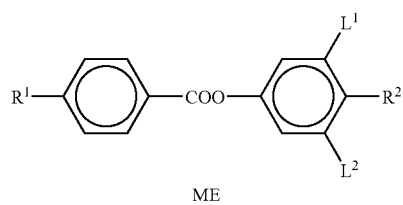
ME
TABLE A-continued
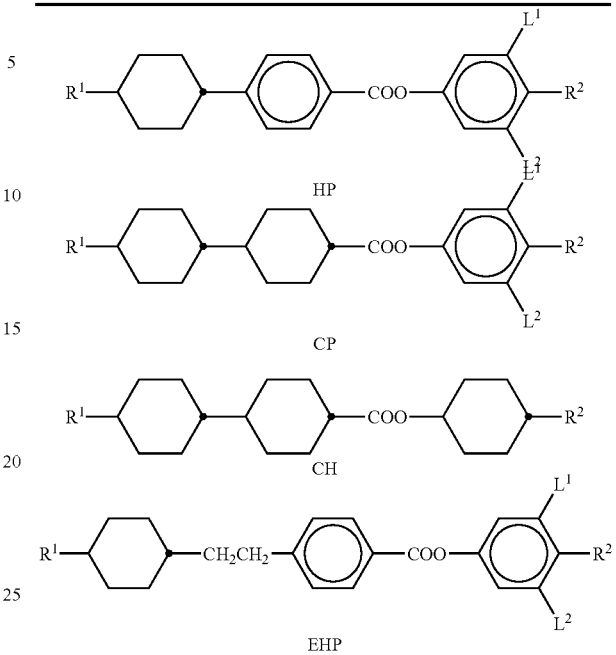
HP
CP
CH
EHP
TABLE B
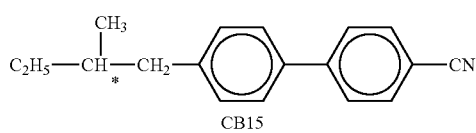
CB15
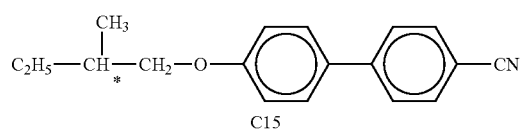
C15
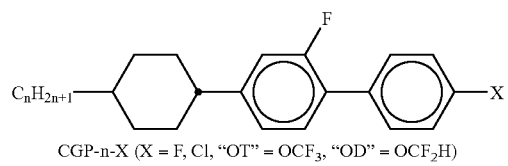
CGP-n-X (X = F, Cl, "OT" = $OCF_3$, "OD" = $OCF_2H$)
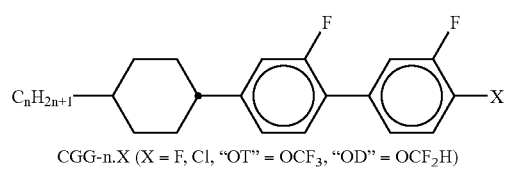
CGG-n.X (X = F, Cl, "OT" = $OCF_3$, "OD" = $OCF_2H$)
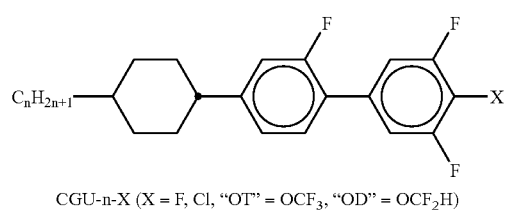
CGU-n-X (X = F, Cl, "OT" = $OCF_3$, "OD" = $OCF_2H$)

TABLE B-continued
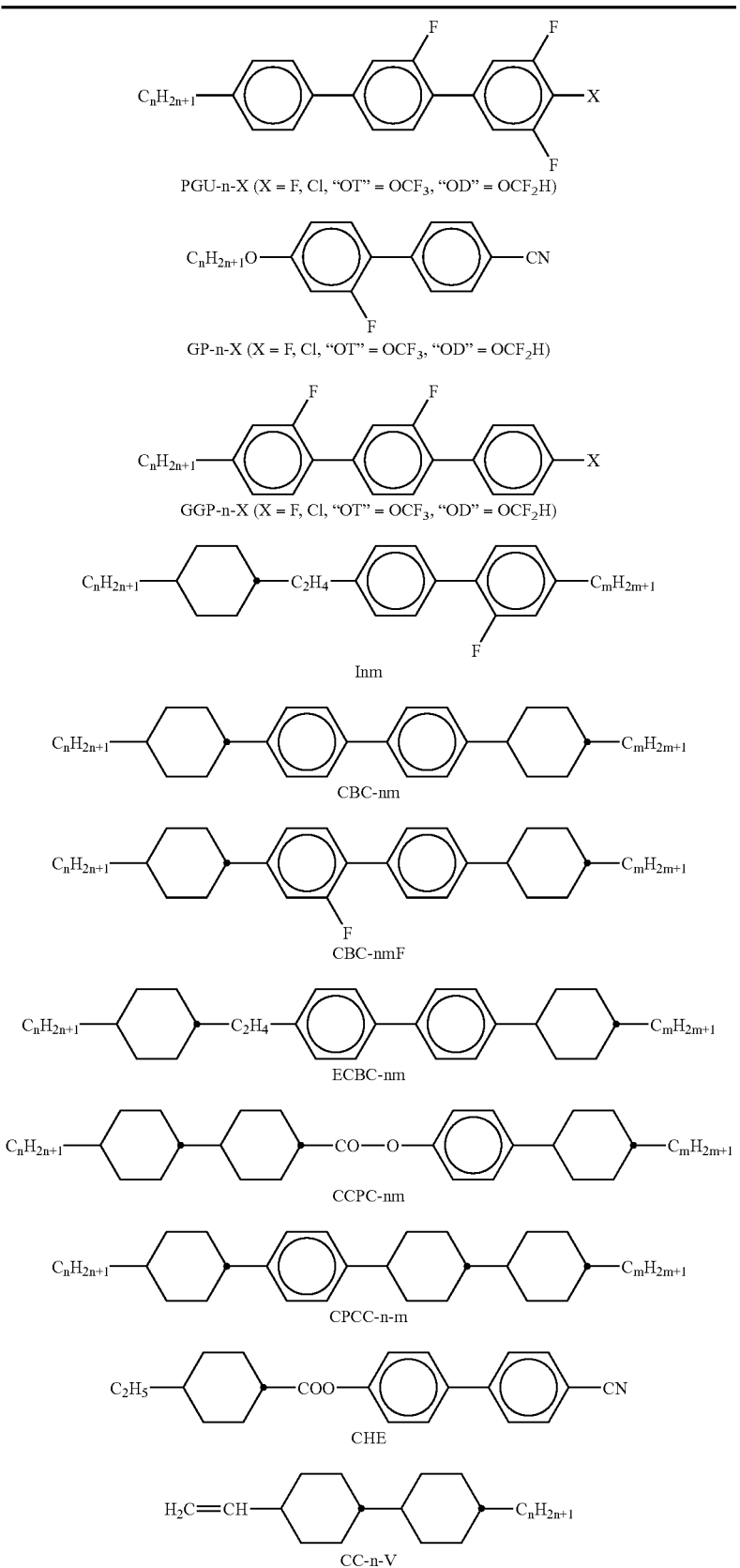

TABLE B-continued
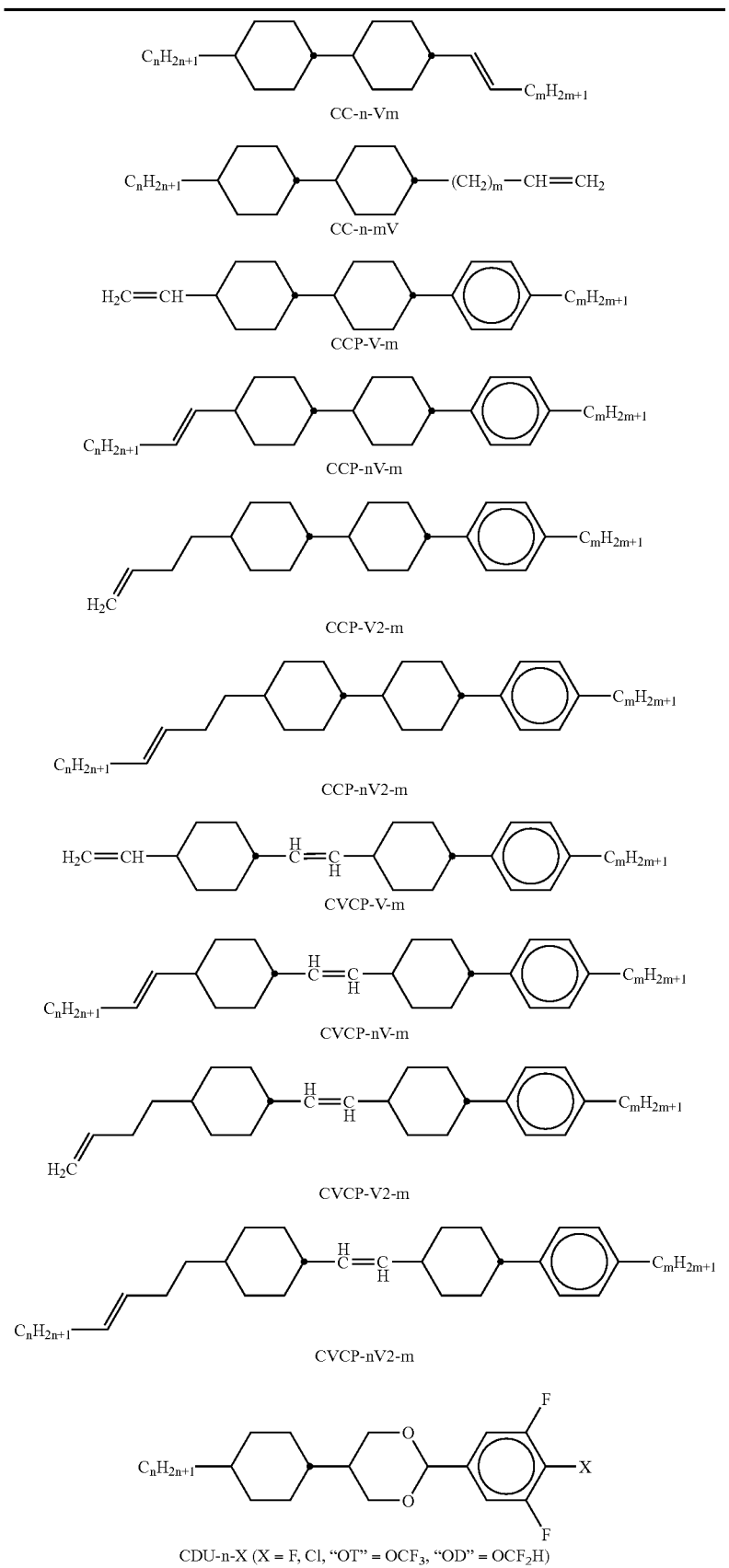

TABLE B-continued
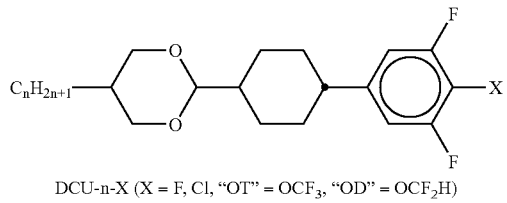
DCU-n-X (X = F, Cl, "OT" = OCF$_3$, "OD" = OCF$_2$H)
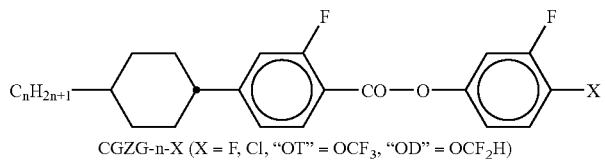
CGZG-n-X (X = F, Cl, "OT" = OCF$_3$, "OD" = OCF$_2$H)
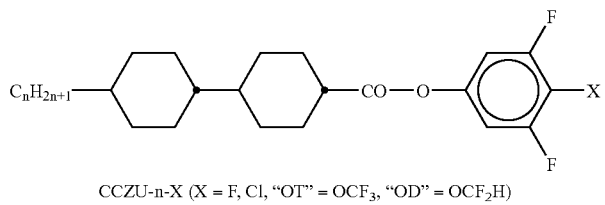
CCZU-n-X (X = F, Cl, "OT" = OCF$_3$, "OD" = OCF$_2$H)
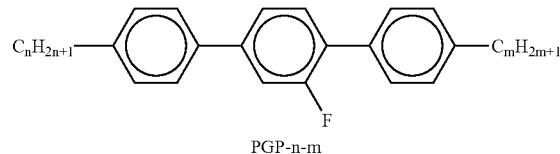
PGP-n-m
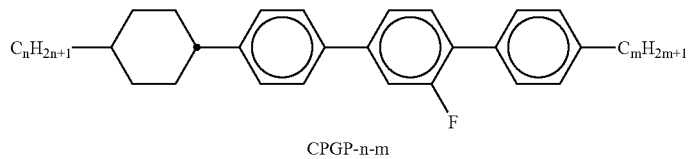
CPGP-n-m
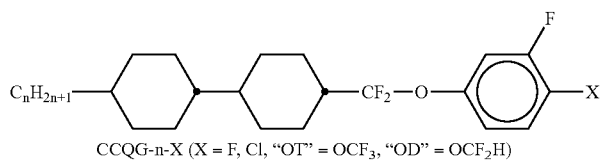
CCQG-n-X (X = F, Cl, "OT" = OCF$_3$, "OD" = OCF$_2$H)
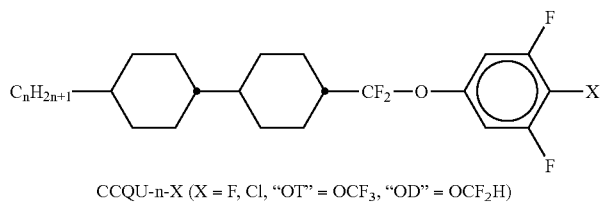
CCQU-n-X (X = F, Cl, "OT" = OCF$_3$, "OD" = OCF$_2$H)
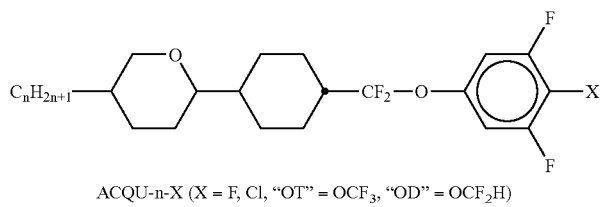
ACQU-n-X (X = F, Cl, "OT" = OCF$_3$, "OD" = OCF$_2$H)

TABLE B-continued
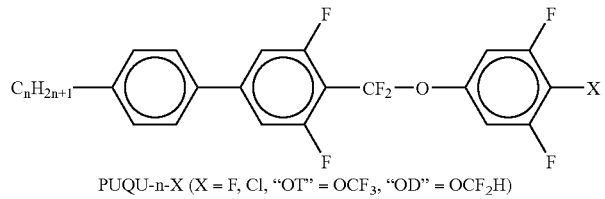
PUQU-n-X (X = F, Cl, "OT" = OCF₃, "OD" = OCF₂H)
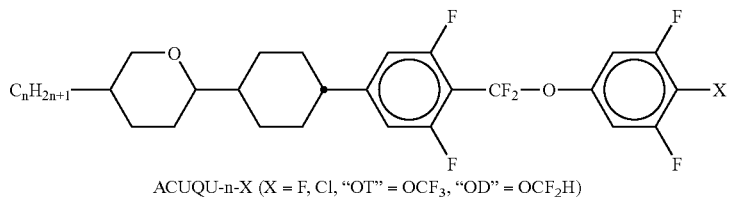
ACUQU-n-X (X = F, Cl, "OT" = OCF₃, "OD" = OCF₂H)
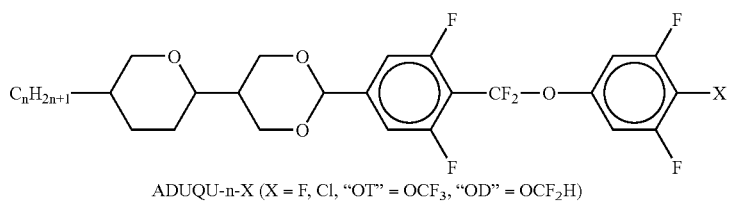
ADUQU-n-X (X = F, Cl, "OT" = OCF₃, "OD" = OCF₂H)
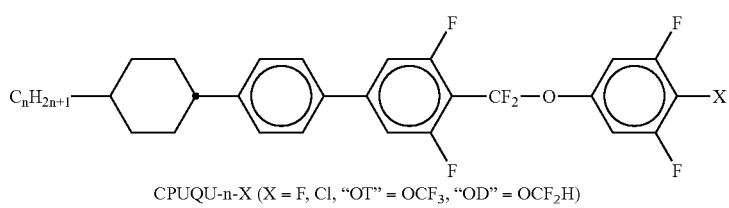
CPUQU-n-X (X = F, Cl, "OT" = OCF₃, "OD" = OCF₂H)
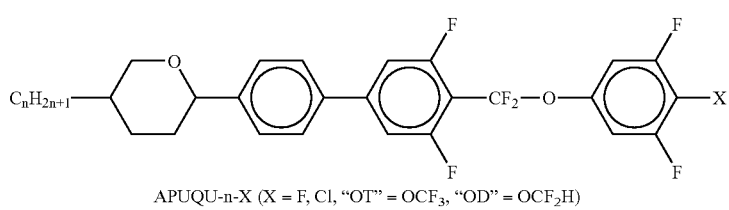
APUQU-n-X (X = F, Cl, "OT" = OCF₃, "OD" = OCF₂H)
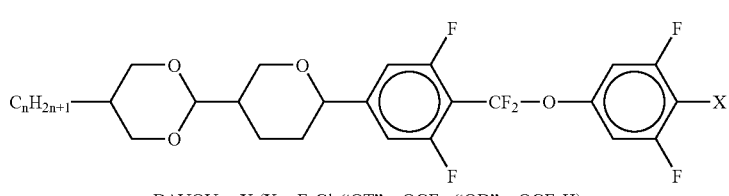
DAUQU-n-X (X = F, Cl, "OT" = OCF₃, "OD" = OCF₂H)
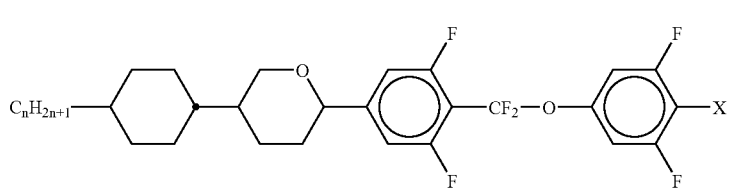
CAUQU-n-X (X = F, Cl, "OT" = OCF₃, "OD" = OCF₂H)
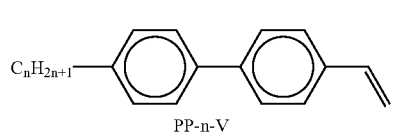
PP-n-V TABLE B-continued

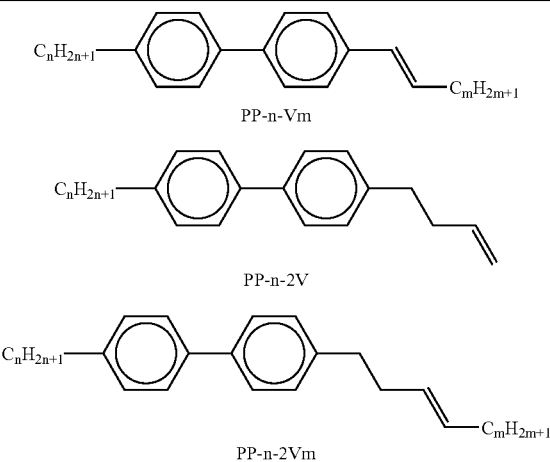

PP-n-Vm

PP-n-2V

PP-n-2Vm

The liquid crystal media according to the instant invention contain preferably
- seven or more, preferably eight or more compounds, preferably of different formulae, selected from the group of compounds of tables A and B and/or
- one or more, more preferably two or more, preferably three or more compounds, preferably of different formulae, selected from the group of compounds of table A and/or
- three or more, more preferably four or more compounds, more preferably five or more compounds, preferably of different formulae, selected from the group of compounds of table B.

The following general schemes and examples are provided to illustrate various embodiments of the present invention and shall not be considered as limiting in scope.

The entire disclosures of all applications, patents and publications, cited above and below, and of European priority application No. 06001671.4, filed Jan. 27, 2006, are hereby incorporated by reference.

EXAMPLES

The examples given in the following are illustrating the present invention without limiting it in any way.

However, the physical properties compositions illustrate to the expert, which properties can be achieved and in which ranges they can be modified. Especially the combination of the various properties, which can be preferably achieved, is thus well defined for the expert.

Example 1

A liquid crystal mixture is realized with the composition and properties given in the following table.

| No. | Composition Compound Abbreviation | Conc./% |
|---|---|---|
| 1 | DAUQU-2-F | 7.00 |
| 2 | PGU-2-F | 8.00 |
| 3 | PUQU-2-F | 9.00 |
| 4 | PUQU-3-F | 8.50 |
| 5 | CC-3-V1 | 13.00 |
| 6 | CC-4-V | 16.00 |
| 7 | CC-5-V | 9.00 |
| 8 | CCP-V-1 | 12.75 |
| 9 | CCP-V2-1 | 13.50 |
| 10 | PCH-3O2 | 3.25 |
| Σ | | 100.00 |

| Physical Properties | |
|---|---|
| T(N, I) = | 74° C. |
| $n_e$ (20° C., 589.3 nm) = | 1.5830 |
| Δn (20° C., 589.3 nm) = | 0.0965 |
| $\epsilon_\parallel$ (20° C., 1 kHz) = | 11.9 |
| Δε (20° C., 1 kHz) = | 8.4 |
| $\gamma_1$ (20° C.) = | 70 mPa·s |
| $k_1$ (20° C.) = | 12.4 pN |
| $k_3/k_1$ (20° C.) = | 1.06 |
| $V_0$ (20° C.) = | 1.28 V |

This mixture has a favourably low value of Δn, a moderately high value of Δε and a very low rotational viscosity. Thus it is very well suited for displays operating in the IPS mode.

Example 2

A liquid crystal mixture is realized with the composition and properties given in the following table.

| No. | Composition Compound Abbreviation | Conc./% |
|---|---|---|
| 1 | DAUQU-2-F | 7.0 |
| 2 | PGU-2-F | 9.0 |
| 3 | PGU-3-F | 6.5 |
| 4 | PUQU-2-F | 8.0 |

-continued

| | | |
|---|---|---|
| 5 | PUQU-3-F | 7.5 |
| 6 | CCP-2OCF3 | 5.0 |
| 7 | CCP-3OCF3 | 8.0 |
| 8 | CC-3-V1 | 12.0 |
| 9 | CC-4-V | 15.0 |
| 10 | CCP-V-1 | 13.0 |
| 11 | CCP-V2-1 | 7.5 |
| 12 | PCH-3O2 | 1.5 |
| Σ | | 100.0 |

Physical Properties

| | |
|---|---|
| T(N, I) = | 78° C. |
| $n_e$ (20° C., 589.3 nm) = | 1.5963 |
| Δn (20° C., 589.3 nm) = | 0.1092 |
| $\epsilon_\parallel$ (20° C., 1 kHz) = | 15.0 |
| Δε (20° C., 1 kHz) = | 11.2 |
| $\gamma_1$ (20° C.) = | 80 mPa·s |
| $k_1$ (20° C.) = | 12.6 pN |
| $k_3/k_1$ (20° C.) = | 0.98 |
| $V_0$ (20° C.) = | 1.13 V |

This mixture has a rather low value of Δn, a rather high value of Δ∈ and a low roational viscosity. Thus it is very well suited for displays operating in the IPS mode.

Example 3

A liquid crystal mixture is realized with the composition and properties given in the following table.

| | Composition Compound | |
|---|---|---|
| No. | Abbreviation | Conc./% |
| 1 | DAUQU-2-F | 7.0 |
| 2 | PGU-2-F | 9.0 |
| 3 | PUQU-2-F | 11.5 |
| 4 | PUQU-3-F | 11.0 |
| 5 | CDU-2-F | 3.0 |
| 6 | CCZU-3-F | 6.0 |
| 7 | CCP-2OCF3 | 7.0 |
| 8 | CCP-3OCF3 | 8.0 |
| 9 | CC-3-V1 | 11.0 |
| 10 | CC-4-V | 12.0 |
| 11 | CCP-V2-1 | 14.5 |
| Σ | | 100.0 |

Physical Properties

| | |
|---|---|
| T(N, I) = | 74.5° C. |
| $n_e$ (20° C., 589.3 nm) = | 1.5854 |
| Δn (20° C., 589.3 nm) = | 0.1025 |
| $\epsilon_\parallel$ (20° C., 1 kHz) = | 18.3 |
| Δε (20° C., 1 kHz) = | 14.0 |
| $\gamma_1$ (20° C.) = | 87 mPa·s |
| $k_1$ (20° C.) = | 11.3 pN |
| $k_3/k_1$ (20° C.) = | 0.95 |
| $V_0$ (20° C.) = | 0.95 V |

This mixture has a favourably low value of Δn, a high value of Δ∈ and a rather low rational viscosity. Thus it is very well suited for displays operating in the IPS mode.

Example 4

A liquid crystal mixture is realized with the composition and properties given in the following table.

| | Composition Compound | |
|---|---|---|
| No. | Abbreviation | Conc./% |
| 1 | CAUQU-2-F | 5.0 |
| 2 | PUQU-2-F | 9.0 |
| 3 | PUQU-3-F | 3.0 |
| 4 | GGP-3-CL | 2.0 |
| 5 | CC-3-V | 27.5 |
| 6 | CC-3-V1 | 14.0 |
| 7 | CCP-V-1 | 14.0 |
| 8 | CCP-V2-1 | 7.5 |
| 9 | PP-1-2V1 | 12.0 |
| 10 | PGP-2-3 | 6.0 |
| Σ | | 100.0 |

Physical Properties

| | |
|---|---|
| T(N, I) = | 71° C. |
| $n_e$ (20° C., 589.3 nm) = | 1.6009 |
| Δn (20° C., 589.3 nm) = | 0.1090 |
| $\epsilon_\parallel$ (20° C., 1 kHz) = | 6.8 |
| Δε (20° C., 1 kHz) = | 3.9 |
| $\gamma_1$ (20° C.) = | 54 mPa·s |
| $k_1$ (20° C.) = | 13.2 pN |
| $k_3/k_1$ (20° C.) = | 1.11 |
| $V_0$ (20° C.) = | 1.94 V |

This mixture has a rather low value of Δn, a moderately positive value of Δ∈ and a very low roational viscosity. Thus it is very well suited for displays operating in the IPS mode.

Example 5

A liquid crystal mixture is realized with the composition and properties given in the following table.

| | Composition Compound | |
|---|---|---|
| No. | Abbreviation | Conc./% |
| 1 | CAUQU-2-F | 8.0 |
| 2 | PUQU-2-F | 10.0 |
| 3 | PUQU-3-F | 9.0 |
| 4 | CDU-2-F | 4.5 |
| 5 | CCZU-3-F | 4.0 |
| 6 | CC-3-V | 35.0 |
| 7 | CC-3-V1 | 11.0 |
| 8 | CCP-V-1 | 9.5 |
| 9 | CCP-V2-1 | 9.0 |
| Σ | | 100.0 |

Physical Properties

| | |
|---|---|
| T(N, I) = | 69° C. |
| $n_e$ (20° C., 589.3 nm) = | 1.5626 |
| Δn (20° C., 589.3 nm) = | 0.0824 |
| $\epsilon_\parallel$ (20° C., 1 kHz) = | 10.7 |
| Δε (20° C., 1 kHz) = | 7.3 |
| $\gamma_1$ (20° C.) = | 56 mPa·s |
| $k_1$ (20° C.) = | 11.5 pN |
| $k_3/k_1$ (20° C.) = | 1.15 |
| $V_0$ (20° C.) = | 1.31 V |

This mixture has a very low value of Δn, a moderately high value of Δ∈ and a very low roational viscosity. Thus it is very well suited for displays operating in the IPS mode.

Example 6

A liquid crystal mixture is realized with the composition and properties given in the following table.

| | Composition Compound | |
|---|---|---|
| No. | Abbreviation | Conc./% |
| 1 | CAUQU-2-F | 10.0 |
| 2 | PGU-2-F | 8.0 |
| 3 | PUQU-2-F | 8.0 |
| 4 | PUQU-3-F | 9.0 |
| 5 | CCP-3OCF3 | 5.0 |
| 6 | CC-4-V | 20.0 |
| 7 | CC-5-V | 4.0 |
| 8 | CC-3-V1 | 13.0 |
| 9 | CCP-V-1 | 10.0 |
| 10 | CCP-V2-1 | 10.0 |
| 11 | PCH-3O2 | 3.0 |
| Σ | | 100.0 |
| | Physical Properties | |
| T(N, I) = | | 74.5° C. |
| $n_e$ (20° C., 589.3 nm) = | | 1.5803 |
| Δn (20° C., 589.3 nm) = | | 0.0959 |
| $\epsilon_{\parallel}$ (20° C., 1 kHz) = | | 11.7 |
| Δε (20° C., 1 kHz) = | | 8.2 |
| $\gamma_1$ (20° C.) = | | 71 mPa·s |
| $k_1$ (20° C.) = | | 12.4 pN |
| $k_3/k_1$ (20° C.) = | | 1.29 |
| $V_0$ (20° C.) = | | 1.29 V |

This mixture has a rather low value of Δn, a moderately high value of Δ∈ and a rather low roational viscosity. Thus it is very well suited for displays operating in the IPS mode.

Example 7

A liquid crystal mixture is realized with the composition and properties given in the following table.

| | Composition Compound | |
|---|---|---|
| No. | Abbreviation | Conc./% |
| 1 | CAUQU-2-F | 10.5 |
| 2 | PGU-2-F | 9.0 |
| 3 | PGU-3-F | 6.0 |
| 4 | PUQU-2-F | 9.0 |
| 5 | PUQU-3-F | 7.0 |
| 6 | CDU-2-F | 2.5 |
| 7 | CCP-2OCF3 | 2.5 |
| 8 | CCP-3OCF3 | 8.0 |
| 9 | CC-4-V | 13.0 |
| 10 | CC-3-V1 | 13.0 |
| 11 | CCP-V-1 | 11.0 |
| 12 | CCP-V2-1 | 8.5 |
| Σ | | 100.0 |
| | Physical Properties | |
| T(N, I) = | | 79.5° C. |
| $n_e$ (20° C., 589.3 nm) = | | 1.5958 |

| -continued | |
|---|---|
| Δn (20° C., 589.3 nm) = | 0.1092 |
| $\epsilon_{\parallel}$ (20° C., 1 kHz) = | 15.1 |
| Δε (20° C., 1 kHz) = | 11.2 |
| $\gamma_1$ (20° C.) = | 86 mPa·s |
| $k_1$ (20° C.) = | 12.3 pN |
| $k_3/k_1$ (20° C.) = | 1.11 |
| $V_0$ (20° C.) = | 1.09 V |

This mixture has a rather low value of Δn, a rather high value of Δ∈ and a rather low roational viscosity. Thus it is very well suited for displays operating in the IPS mode.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid crystal medium comprising:
a first dielectrically positive component, component A, comprising one or more dielectrically positive compounds of formula I

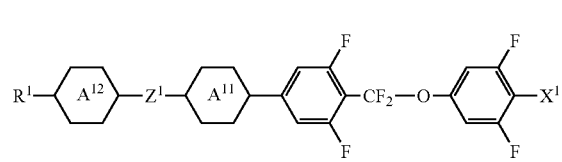

I wherein
$R^1$ is alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl, or fluorinated alkenyl having 2 to 7 C-atoms,

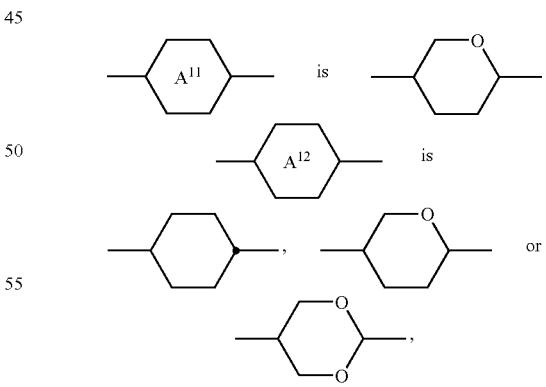

$X^1$ is halogen, halogenated alkyl having 1 to 3 C-atoms, halogenated alkoxy having 1 to 3 C-atoms, halogenated alkenyl having 2 to 3 C-atoms, or halogenated alkenyloxy having 2 to 3 C-atoms, and
$Z^1$ is —CH$_2$CH$_2$—, —CF$_2$CF$_2$—, —COO—, trans- —CH=CH—trans- —CF=CF—, —CH$_2$O— or a single bond; and optionally, a second dielectrically positive component, component B, comprising one or more dielectrically positive compounds having a dielectric anisotropy of more than 3, from which compounds of formula I are excluded, selected from compounds of formulae II and III

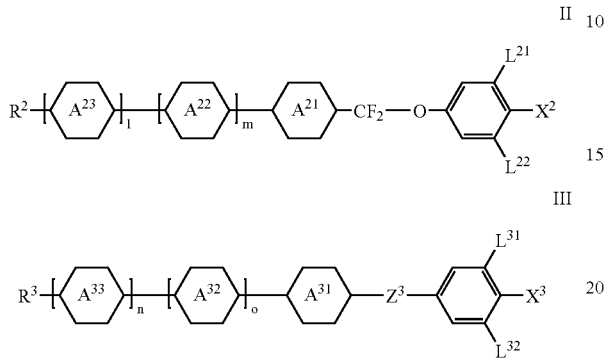

wherein $R^2$ and $R^3$, are each, independently of each other, alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 1 to 7 C-atoms, or fluorinated alkenyl having 2 to 7 C-atoms,

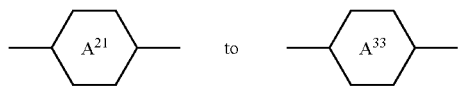

are each, independently of each other,

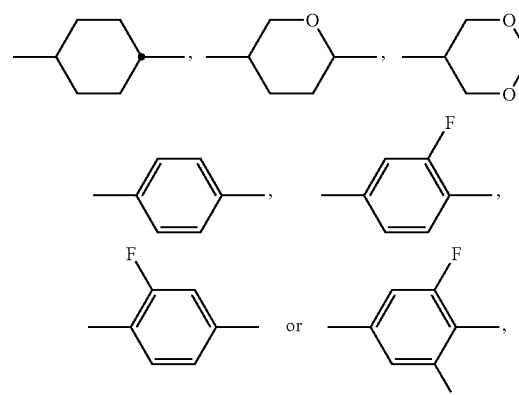

$L^{21}$, $L^{22}$, $L^{31}$ and $L^{32}$, are each, independently of each other, H or F, $X^2$ and $X^3$ are each, independently of each other, halogen, halogenated alkyl having 1 to 3 C-atoms, alkoxy having 1 to 3 C-atoms, halogenated alkenyl having 2 to 3 C-atoms, or halogenated alkenyloxy having 2 to 3 C-atoms, $Z^3$ is —$CH_2CH_2$—, —$CF_2CF_2$—, —COO—, trans- —CH=CH—, trans- —CF=CF—, —$CH_2O$— or a single bond, and l, m, n and o are, independently of each other, 0 or 1; and optionally a dielectrically neutral component, component C, comprising one or more dielectrically neutral compounds of formula IV

wherein $R^{41}$ and $R^{42}$ are each, independently of each other, alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 1 to 7 C-atoms, or fluorinated alkenyl having 2 to 7 C-atoms,

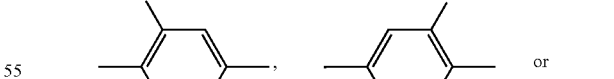

independently of each other, and in case

is present twice, also these, independently of each other, are in each case

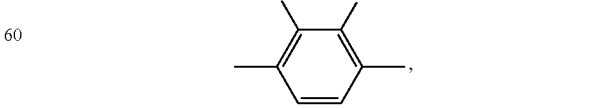

$Z^{41}$ and $Z^{42}$ are each, independently of each other, and in case $Z^{41}$ is present twice, also these independently of each other,—$CH_2CH_2$—, —COO—, trans- —CH=CH—, trans- —CF=CF—, —CH$_2$O—, —CF$_2$O— or a single bond, and p is 0, 1 or 2.

2. A liquid crystal medium according to claim 1, wherein the concentration of component A in the medium is 1% to 60%.

3. A liquid crystal medium according to claim 1, wherein component A comprises one or more compounds selected from formulae I-1 to I-3

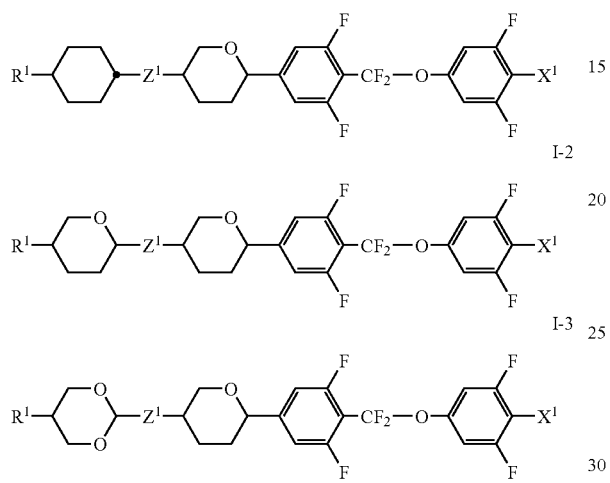

wherein
R$^1$ is alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl, or fluorinated alkenyl having 2 to 7 C-atoms, and X$^1$ is halogen, halogenated alkyl having 1 to 3 C-atoms, halogenated alkoxy having 1 to 3 C-atoms, halogenated alkenyl having 2 to 3 C-atoms, or halogenated alkenyloxy having 2 to 3 C-atoms.

4. A liquid crystal medium according to claim 1, wherein said medium comprises one or more compounds of formula II.

5. A liquid crystal medium according to claim 1, wherein said medium comprises one or more compounds of formula III.

6. A liquid crystal medium according to claim 1, wherein said medium comprises one or more dielectrically neutral compounds of formula IV.

7. A liquid crystal medium according to claim 1, further comprising component D, which comprises one or more compounds of formula VI

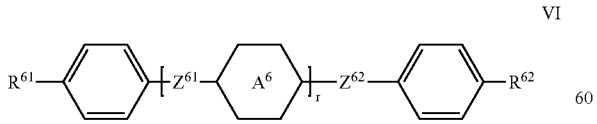

wherein
R$^{61}$ and R$^{62}$ are each, independently of each other, alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 1 to 7 C-atoms, or fluorinated alkenyl having 2 to 7 C-atoms,

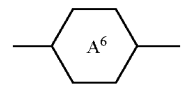

Is, in case independently of each other,

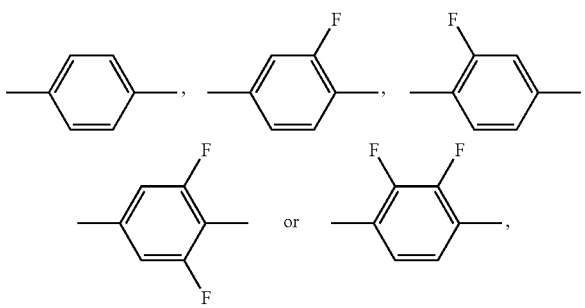

Z$^{61}$ and Z$^{62}$ are in each case, independently of each other, —CH$_2$CH$_2$—, —COO—, trans- —CH=CH—, trans- —CF=CF—, —CH$_2$O—, —CF$_2$O— or a single bond, and r is 0, 1 or 2.

8. A liquid crystal medium according to claim 1, further comprising component E, which has a negative dielectric anisotropy and which comprises one or more dielectrically negative compounds of formula VII

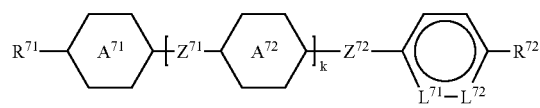

wherein
R$^{71}$ and R$^{71}$ are each, independently of each other, alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 1 to 7 C-atoms, or fluorinated alkenyl having 2 to 7 C-atoms,

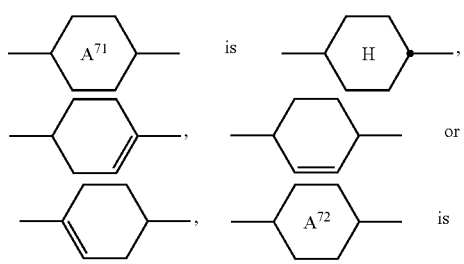

-continued

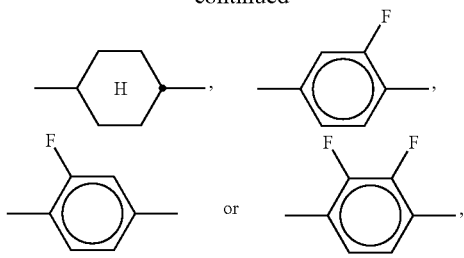

$Z^{71}$ and $Z^{72}$ are each, independently of each other, —$CH_2CH_2$—, —COO—, trans- —CH=CH—, trans- —CF=CF—, —$CH_2O$—, —$CF_2O$— or a single bond,
$L^{71}$ and $L^{72}$ are each, independently of each other, C—F or N, and
k is 0 or 1.

9. A compound according to claim 1, wherein $R^1$ is alkyl having 1 to 7 C-atoms or alkenyl having 2 to 7 C-atoms.

10. A compound according to claim 1, wherein

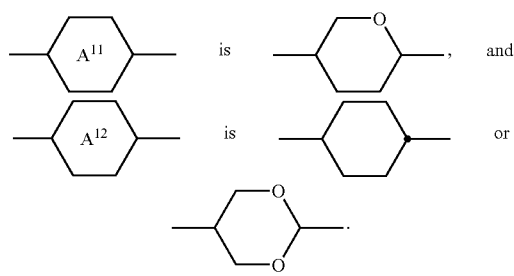

11. A liquid crystal medium according to claim 1, wherein said medium has a clearing point of more than 70° C..

12. A liquid crystal medium according to claim 1, wherein the Δn, at 589 nm ($Na^D$) and 20° C., of the liquid crystal medium is within the range of 0.060 to 0.135.

13. A liquid crystal medium according to claim 1, wherein the Δ∈ of the liquid crystal medium is at least 4.0.

14. A liquid crystal medium according to claim 1, wherein said medium has a nematic phase from 0° C. to 70° C..

15. A liquid crystal medium according to claim 1, wherein the Δn of the liquid crystal medium is within the range of 0.090 to 0.125 and the Δ∈ of the liquid crystal medium is within the range of 4.0 to 10.0.

16. A liquid crystal medium according to claim 1, wherein the Δn of the liquid crystal medium is within the range of 0.085 or to 0.130, and the Δ∈ of the liquid crystal medium is at least 6.0.

17. A liquid crystal medium according to claim 1, wherein the Δn of the liquid crystal medium is within the range of 0.070 or 0.120, and the Δ∈ of the liquid crystal medium is within the range of 4.0 to 14.0.

18. A liquid crystal medium according to claim 1, wherein Component A is present in said medium in a concentration from 1% to 65%.

19. A liquid crystal medium according to claim 1, wherein Component B is present in said medium in a concentration from 5% to 60%.

20. A liquid crystal medium according to claim 18, wherein Component B is present in said medium in a concentration from 5% to 60%.

21. A liquid crystal medium according to claim 1, wherein Component C is present in said medium in a concentration from 0% to 70%.

22. A liquid crystal medium according to claim 20, wherein Component C is present in said medium in a concentration from 0% to 70%.

23. A liquid crystal display containing a liquid crystal medium, wherein said medium is a medium according to claim 1.

24. A liquid crystal display according to claim 23, wherein said display is addressed by an active matrix.

25. In a method of generating an optical effect using a liquid crystal display, the improvement wherein said display is a display according to claim 23.

26. A liquid crystal medium according to claim 3, wherein component A comprises one or more compounds of formula I-1.

27. A liquid crystal medium according to claim 3, wherein component A comprises one or more compounds of formula I-2.

28. A liquid crystal medium according to claim 3, wherein component A comprises one or more compounds of formula I-3.

29. A liquid crystal medium according to claim 26, wherein $Z^1$ is a single bond and $X^1$ is F.

30. A liquid crystal medium according to claim 27, wherein $Z^1$ is a single bond and $X^1$ is F.

31. A liquid crystal medium according to claim 28, wherein $Z^1$ is a single bond and $X^1$ is F.

32. A liquid crystal medium according to claim 4, wherein said compounds of formula II are selected from formulae II-1 and II-2

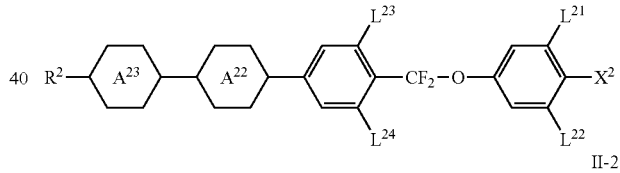

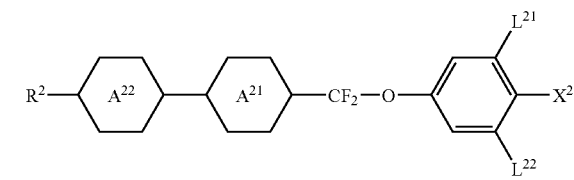

wherein $L^{23}$ and $L^{24}$ are, independently of each other and of the other parameters, H or F.

33. A liquid crystal medium according to claim 32 wherein said compounds of formula II are selected from formula II-1a-1, II-1c-1, II-1d-1, II-2a-1, II-2a-2, II-2b-1, and II-2d-1:

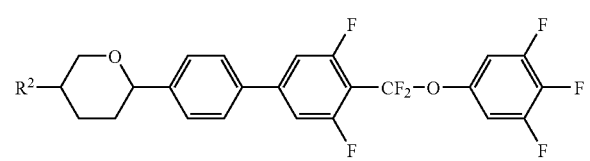

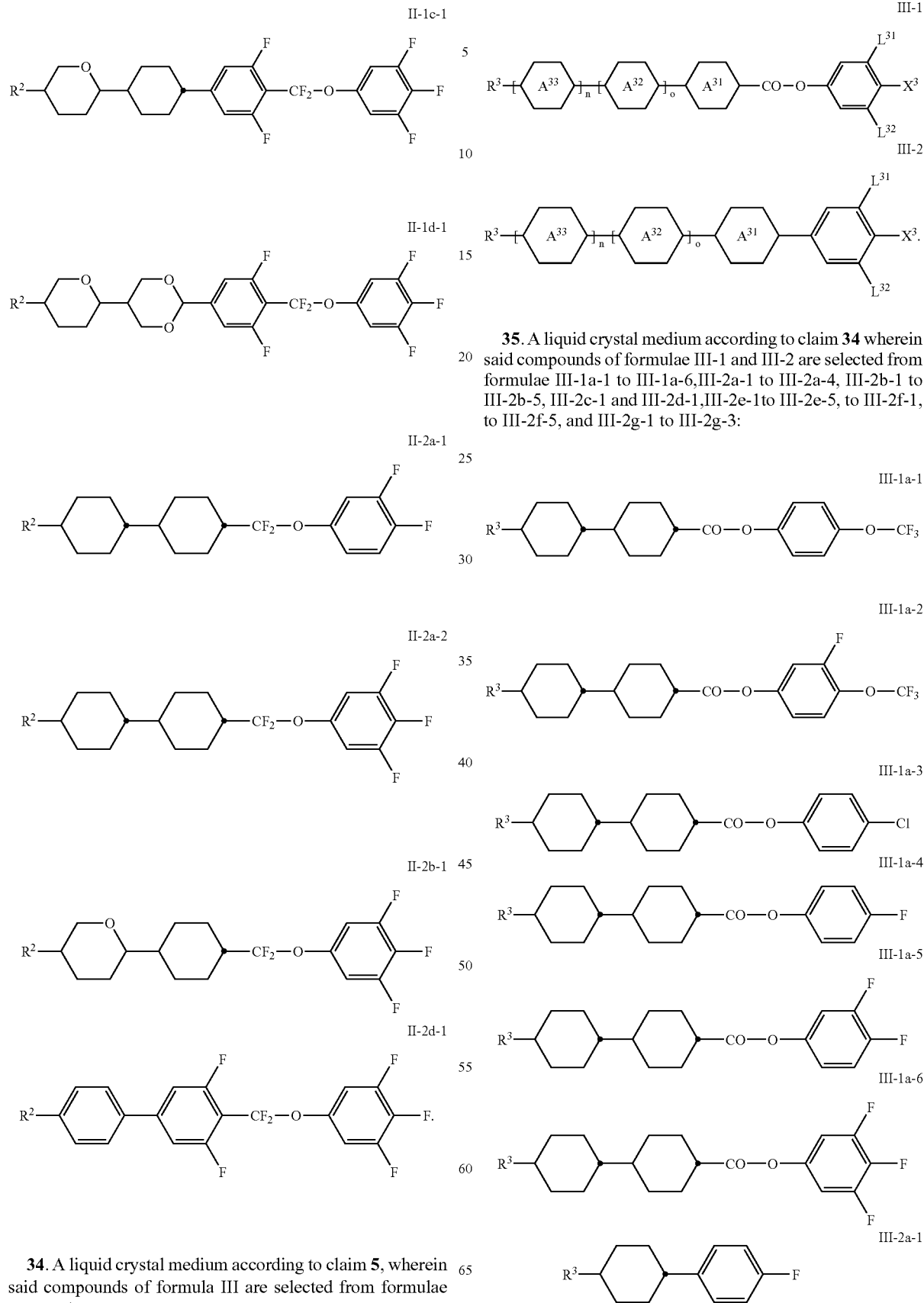
35. A liquid crystal medium according to claim 34 wherein said compounds of formulae III-1 and III-2 are selected from formulae III-1a-1 to III-1a-6, III-2a-1 to III-2a-4, III-2b-1 to III-2b-5, III-2c-1 and III-2d-1, III-2e-1 to III-2e-5, to III-2f-1, to III-2f-5, and III-2g-1 to III-2g-3:
34. A liquid crystal medium according to claim 5, wherein said compounds of formula III are selected from formulae III-1 and III-2:
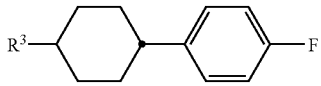

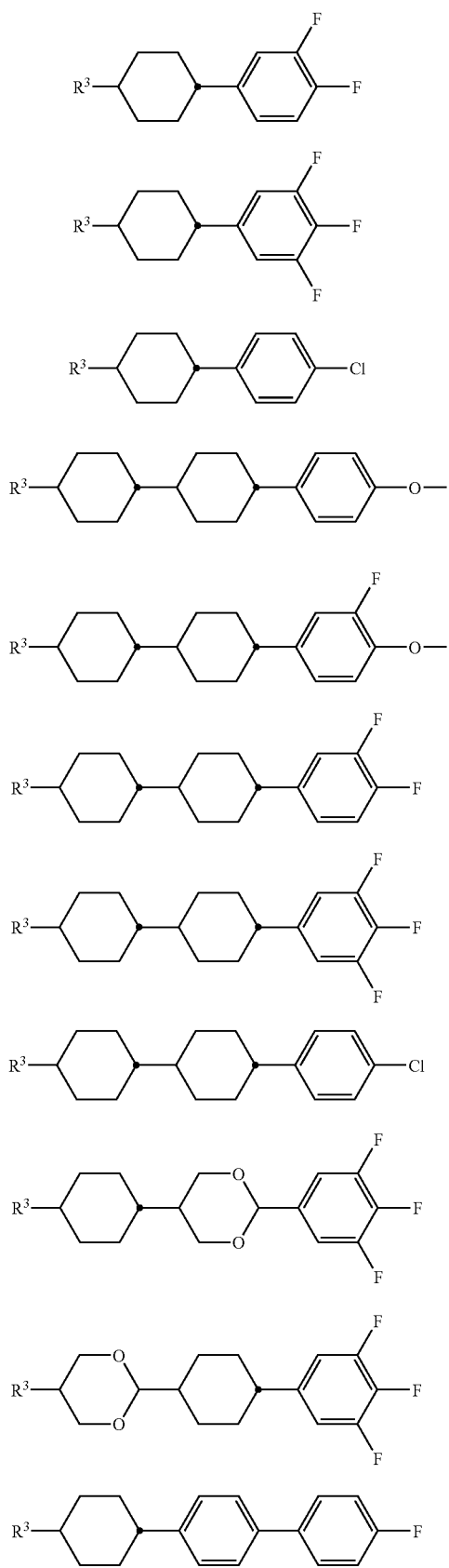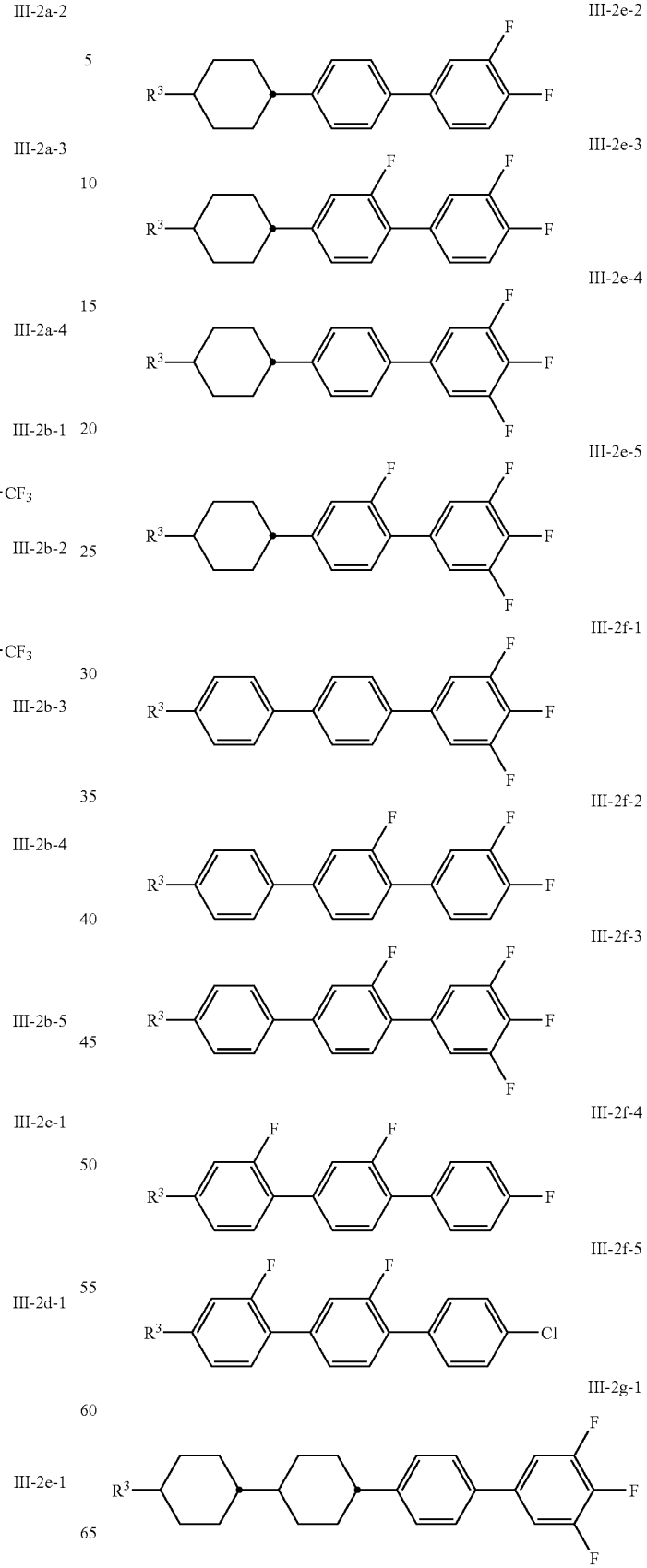

-continued

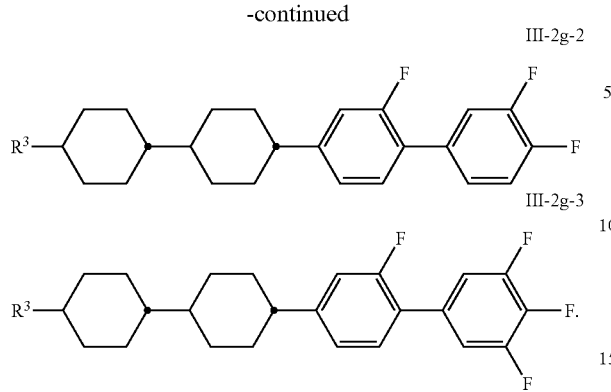

36. A liquid crystal medium according to claim 34, wherein said medium further comprises one or more compounds of formula III-3

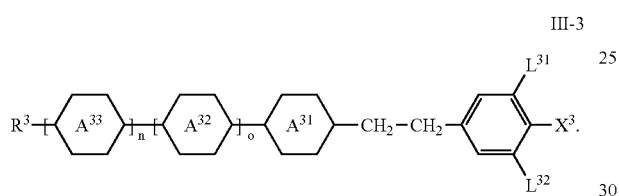

37. A liquid crystal medium according to claim 6, wherein said compounds of formula IV are selected from formulae IV-1 to IV-5:

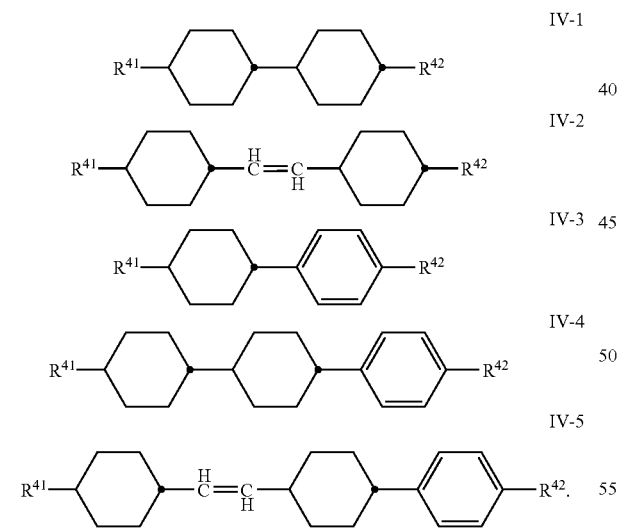

38. A liquid crystal medium according to claim 1, wherein
said medium has a clearing point of 70° C. or more;
said medium has a Δn, at 589 nm ($Na^D$) and 20° C., in the range of 0.060 to 0.135,
said medium has a Δ∈, at 1 kHz and 20° C., of 4.0 or more, and
said medium has a nematic phase from 0 0° C. or less to 70° C. more.

39. A liquid crystal medium comprising:
a first dielectrically positive component, component A, comprising one or more dielectrically positive compounds of formula I

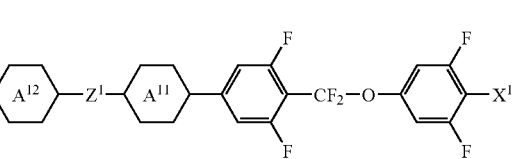

wherein
$R^1$ is alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl, or fluorinated alkenyl having 2 to 7 C-atoms,

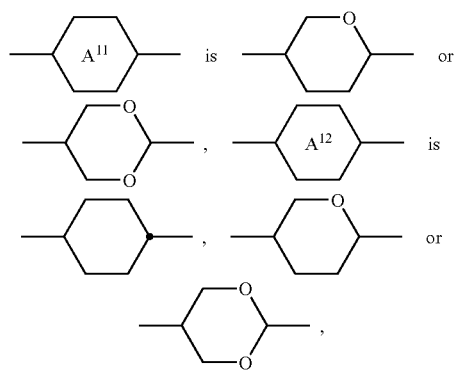

$X^1$ is halogen, halogenated alkyl having 1 to 3 C-atoms, halogenated alkoxy having 1 to 3 C-atoms, halogenated alkenyl having 2 to 3 C-atoms, or halogenated alkenyloxy having 2 to 3 C-atoms, and
$Z^1$ is —$CH_2CH_2$—, —$CF_2CF_2$—, —COO—, trans- —CH=CH—, trans- —CF=CF—, —$CH_2O$— or a single bond; and
optionally, a second dielectrically positive component, component B, comprising one or more dielectrically positive compounds having a dielectric anisotropy of more than 3, from which compounds of formula I are excluded, selected from the group of compounds of formulae II and III

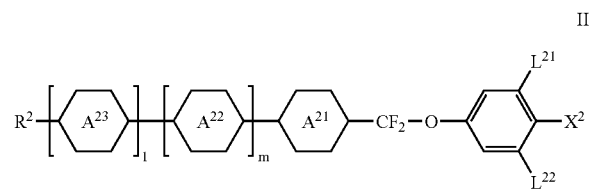

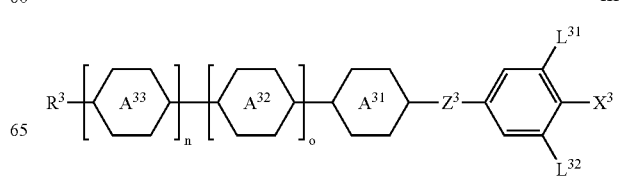

wherein

R$^2$ and R$^3$, are each, independently of each other, alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 1 to 7 C-atoms, or fluorinated alkenyl having 2 to 7 C-atoms,

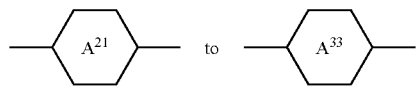

are each, independently of each other,

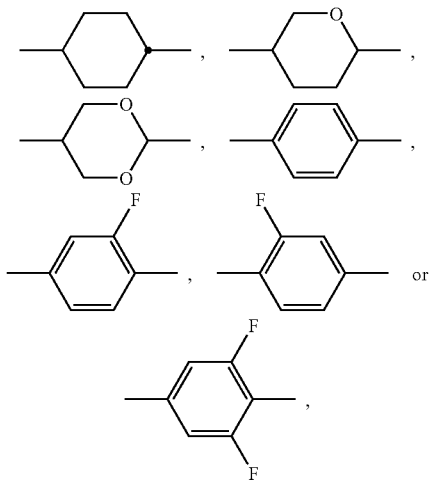

L$^{21}$, L$^{22}$, L$^{31}$ and L$^{32}$, are each, independently of each other, H or F, X$^2$ and X$^3$ are each, independently of each other, halogen, halogenated alkyl having 1 to 3 C-atoms, alkoxy having 1 to 3 C-atoms, halogenated alkenyl having 2 to 3 C-atoms, or halogenated alkenyloxy having 2 to 3 C-atoms, Z$^3$ is —CH$_2$CH$_2$—, —CF$_2$CF$_2$—, —COO—, trans- —CH=CH—, trans- —CF=CF—, —CH$_2$O— or a single bond, and l, m, n and o are, independently of each other, 0 or 1;

optionally a dielectrically neutral component, component C, comprising one or more dielectrically neutral compounds of formula IV

IV wherein

R$^{41}$ and R$^{42}$ are each, independently of each other, alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 1 to 7 C-atoms, or fluorinated alkenyl having 2 to 7 C-atoms,

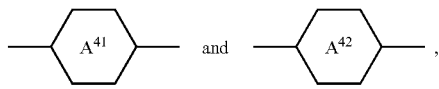

independently of each other, and in case

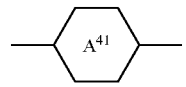

is present twice, also these, independently of each other, are in each case

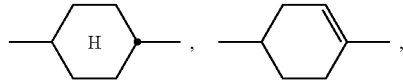

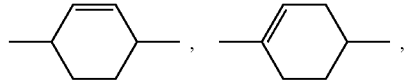

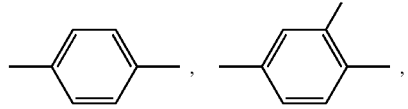

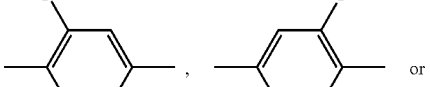

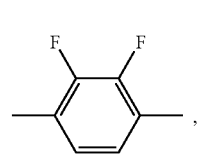

Z$^{41}$ and Z$^{42}$ are each, independently of each other, and in case Z$^{41}$ is present twice, also these independently of each other, —CH$_2$CH$_2$—, —COO—, trans- —CH=CH—, trans- —CF=CF—, —CH$_2$O—, —CF$_2$O— or a single bond, and p is 0, 1 or 2; and said medium further comprising component E, which has a negative dielectric anisotropy and which comprises one or more dielectrically negative compounds of formula VII

VII wherein

R$^{71}$ and R$^{72}$ are each, independently of each other, alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 1 to 7 C-atoms, or fluorinated alkenyl having 2 to 7 C-atoms,

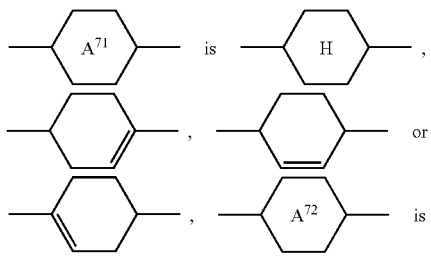

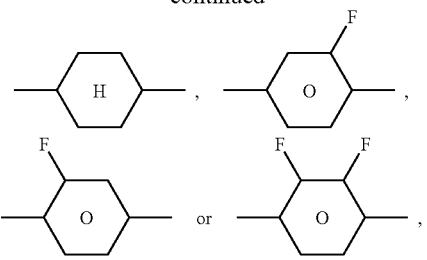

Z$^{71}$ and Z$^{72}$ are each, independently of each other, —CH$_2$CH$_2$—, —COO—, trans- —CH=CH—, trans- —CF=CF—, —CH$_2$O—, —CF$_2$O— or a single bond, L$^{71}$ and L$^{72}$ are each, independently of each other, C—F or N, and k is 0 or 1.

* * * * *

UNITED STATES PATENT AND TRADEMARK OFFICE
CERTIFICATE OF CORRECTION

PATENT NO. : 7,445,819 B2
APPLICATION NO. : 11/698280
DATED : November 4, 2008
INVENTOR(S) : Markus Czanta et al.

It is certified that error appears in the above-identified patent and that said Letters Patent is hereby corrected as shown below:

Column 44, line 47, reads "  " should read --  , --

Column 44, line 66, reads "—CH=CH—trans- —CF=CF—," should read -- —CH=CH—,trans- —CF=CF—, --

Column 45, line 67, reads "halogenated.alkenyloxy" should read -- halogenated alkenyloxy --

Column 46, line 19, reads "C-atoms,alkoxy" should read -- C-atoms, alkoxy --

Column 46, line 67, reads "other,—CH$_2$CH$_2$—," should read -- other, —CH$_2$CH$_2$—, --

Column 48, line 12, reads "Is, in each" should read -- is, in each --

Column 48, line 65, after the first formula, begin new line

Column 49, line 53, reads "0.085 or to 0.130," should read -- 0.085 to 0.130, --

Column 49, line 57, reads "0.070 or 0.120," should read -- 0.070 to 0.120, --

Column 50, line 55, reads "claim 32 wherein" should read -- claim 32, wherein --

Column 52, line 19, reads "claim 34 wherein" should read -- claim 34, wherein --

Column 55, line 60, reads "70°C.or more;" should read -- 70°C or more; --

Column 55, line 66, reads "0 0° C." should read -- 0° C --

Column 55, line 67, reads "C. more." should read -- C or more. --

Column 56, line 27, after the first formula, begin new line

Column 56, line 38, reads "X$^1$is" should read -- X$^1$ is --

Column 56, line 42, reads "Z$^1$is" should read -- Z$^1$ is --

UNITED STATES PATENT AND TRADEMARK OFFICE
CERTIFICATE OF CORRECTION

PATENT NO. : 7,445,819 B2  Page 2 of 2
APPLICATION NO. : 11/698280
DATED : November 4, 2008
INVENTOR(S) : Markus Czanta et al.

It is certified that error appears in the above-identified patent and that said Letters Patent is hereby corrected as shown below:

Column 57, line 41, reads "$X^2$and $X^3$are" should read -- $X^2$ and $X^3$ are --

Column 58, line 49, reads "—$CH_2CH_2$—,—COO—," should read
-- —$CH_2CH_2$—, —COO—, --

Column 59, line 12, reads " 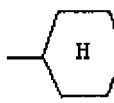 " should read -- 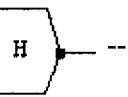 --

Column 59, line 19, after the first formula, begin new line

Column 60, line 6, reads " 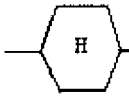 " should read -- 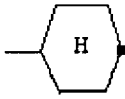 --

Signed and Sealed this

Tenth Day of November, 2009

David J. Kappos
*Director of the United States Patent and Trademark Office*